(12) United States Patent　　　　　(10) Patent No.: US 12,530,544 B2
Canberk et al.　　　　　　　　　　　　(45) Date of Patent: Jan. 20, 2026

(54) GENERATING AUGMENTED REALITY CONTENT INCLUDING TRANSLATIONS

(71) Applicant: Snap Inc., Santa Monica, CA (US)

(72) Inventors: Ilteris Kaan Canberk, Marina Del Rey, CA (US); Shin Hwun Kang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 434 days.

(21) Appl. No.: 18/082,969

(22) Filed: Dec. 16, 2022

(65) Prior Publication Data

US 2024/0202470 A1　Jun. 20, 2024

(51) Int. Cl.
| | |
|---|---|
| *G10L 15/26* | (2006.01) |
| *G06F 3/0488* | (2022.01) |
| *G06F 40/58* | (2020.01) |
| *G06T 7/73* | (2017.01) |
| *G06T 11/00* | (2006.01) |
| *G06V 20/20* | (2022.01) |
| *G10L 13/02* | (2013.01) |

(52) U.S. Cl.
CPC ............ *G06F 40/58* (2020.01); *G06F 3/0488* (2013.01); *G06T 7/73* (2017.01); *G06T 11/00* (2013.01); *G06V 20/20* (2022.01); *G10L 13/02* (2013.01); *G06T 2200/24* (2013.01)

(58) Field of Classification Search
None
See application file for complete search history.

(56) References Cited

U.S. PATENT DOCUMENTS

| 10,331,874 | B1 * | 6/2019 | Benkreira | ............ | G06Q 20/322 |
| 11,144,732 | B2 * | 10/2021 | Huang | ................ | G06F 40/268 |
| 2011/0090253 | A1 * | 4/2011 | Good | ..................... | G06V 30/15 |
| | | | | | 345/633 |
| 2013/0063550 | A1 * | 3/2013 | Ritchey | ................ | A61B 5/7246 |
| | | | | | 345/207 |

(Continued)

FOREIGN PATENT DOCUMENTS

| CN | 120418801 A | 8/2025 |
| JP | 2015049372 | 3/2015 |

(Continued)

OTHER PUBLICATIONS

"International Application Serial No. PCT US2023 084405, International Search Report mailed Apr. 29, 2024", 3 pgs.

(Continued)

*Primary Examiner* — Neeraj Sharma
(74) *Attorney, Agent, or Firm* — Schwegman Lundberg & Woessner, P.A.

(57) ABSTRACT

An augmented reality (AR) translation system is provided. The AR translation system may analyze camera data to determine objects included in a field of view of a camera of a user device. Augmented reality content may be provided that includes a visual translation of an object included in the field of view from a primary language of the user to an additional language. An audible version of the translation may also be provided as part of the augmented reality content. Users may also add an object in the field of view to a listing of translated objects associated with the user based on at least one of touch input, audio input, or gesture input.

20 Claims, 12 Drawing Sheets

(56) References Cited

U.S. PATENT DOCUMENTS

| | | | | |
|---|---|---|---|---|
| 2015/0134322 A1* | 5/2015 | Cuthbert | ................ | G06F 40/58 |
| | | | | 704/3 |
| 2016/0026253 A1* | 1/2016 | Bradski | ............... | H04N 13/128 |
| | | | | 345/8 |
| 2017/0186230 A1* | 6/2017 | Ivers | ................... | G06F 3/04842 |
| 2018/0173323 A1* | 6/2018 | Harvey | .................. | G06F 3/011 |
| 2019/0138117 A1 | 5/2019 | Kawano et al. | | |
| 2019/0228269 A1* | 7/2019 | Brent | ..................... | G06V 10/82 |
| 2020/0013206 A1* | 1/2020 | Seely | .................... | G06F 40/154 |
| 2022/0138439 A1 | 5/2022 | Tambi et al. | | |
| 2023/0128422 A1* | 4/2023 | Li | .......................... | G10L 15/24 |
| | | | | 345/156 |
| 2023/0144825 A1* | 5/2023 | Hu | ......................... | G06F 3/043 |
| | | | | 345/177 |

FOREIGN PATENT DOCUMENTS

| | | |
|---|---|---|
| KR | 102313272 | 10/2021 |
| WO | 2020053913 | 3/2020 |
| WO | 2024130194 | 6/2024 |

OTHER PUBLICATIONS

"International Application Serial No. PCT US2023 084405, Written Opinion mailed Apr. 29, 2024", 5 pgs.

"International Application Serial No. PCT/US2023/084405, International Preliminary Report on Patentability mailed Jun. 26, 2025", 7 pgs.

\* cited by examiner

GENERATING AUGMENTED REALITY CONTENT INCLUDING TRANSLATIONS

TECHNICAL FIELD

The present disclosure relates generally to generating augmented reality content that includes translations.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
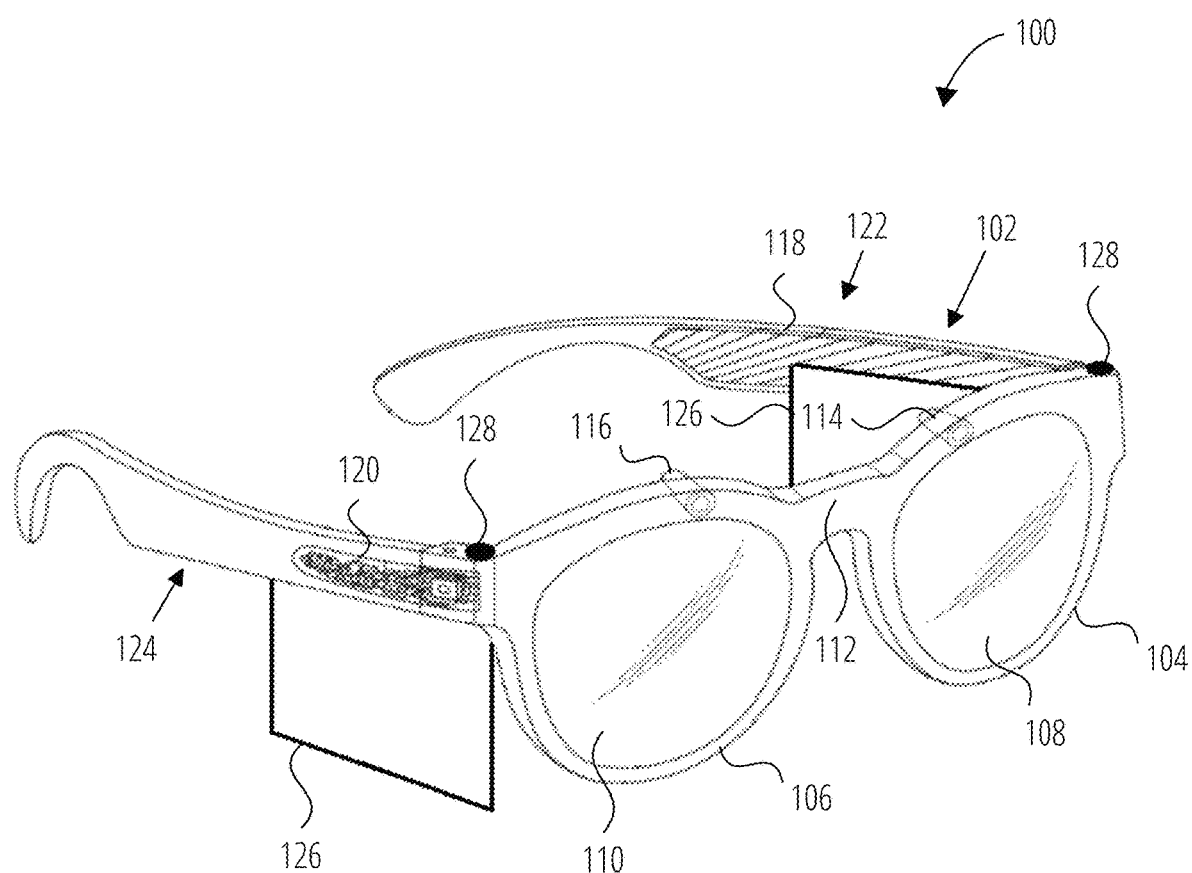
FIG. 1 is a perspective view of a head-worn device, in accordance with one or more examples.

In many augmented reality (AR) systems, users may interact with virtual objects that are displayed in their environment. An input modality that may be utilized with AR systems is hand-tracking combined with Direct Manipulation of Virtual Objects (DMVO) where a user is provided with a user interface that is displayed to the user in an AR overlay having a two-dimensional (2D) or three-dimensional (3D) rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects. Additionally, the AR system may respond to commands provided by users to determine a user's interactions with the virtual objects.

There are a variety of ways that individuals attempt to learn languages. In some scenarios, individuals attend a class in-person, online, or both in order to learn a language. In other situations, individuals utilize user applications that execute on a computing device, such as a mobile phone, laptop computing device, or tablet computing device, and are tailored to teaching vocabulary and grammar of one or more languages. In existing systems that rely on computing devices and user applications to teach a language, users are typically unable to identify identifiers of objects within their environment as they are viewing their environment. That is, as individuals move from place to place within a location, the individuals encounter a number of objects for which the individuals may recall identifiers of the objects in a first language, but not in a second language. With existing systems in these instances, individuals may access a user application executing on a computing device to perform a translation operation and determine an identifier for the objects in the second language. This is often an inefficient process because the individuals take the time to look away from the objects being viewed in their environments in order to focus their attention on entering the identifiers of the objects in the first language and request translations into the second language. Thus, existing systems lack the capability to translate identifiers of objects from a first language to a second language while individuals are viewing the objects in their environment.

Implementations of an augmented reality system described herein may enable a user to view translations of identifiers of objects while viewing the objects in the environment of the user. In various examples, users may tag objects in their environment while viewing the objects. The tags may indicate that identifiers of the objects are to be translated from a first language to a second language. In one or more examples, users may tag an object by placing the object within a field of view of a camera of a mobile computing device and providing an object tagging input. The object tagging input may include audio input, gesture input, or a combination thereof. The object tagging input may also include a touch input that corresponds to a user touching a portion of the mobile computing device while an object is in the field of view of the camera of the mobile computing device. In response to tagging the object, an identifier of the object may be stored in a data store that includes data structures for users of a translation augmented reality (AR) content item that is executing within a user application. The data structures may indicate default languages of users and additional languages selected by users that are related to translations. Additionally, the data structures may indicate objects and/or identifiers of the objects for which the users have requested a translation. Further, the data structures may indicate locations of objects for which the users have requested a translation.

After users have tagged objects, as the user moves through their environment, the translations of the identifiers of the objects may be displayed in a user interface of a user device. For example, the location of the user device may be determined and the objects tagged by the user for translation that correspond to the location and that are included in a field of view of a camera of the user device may be identified. The translations for those objects may then be displayed as augmented reality content overlaid on a live view of a scene that includes the objects. Additionally, audio content may be played of a pronunciation of the translation for an object in a center of the field of view of the camera. In this way, as a user views objects in their environment, translations of identifiers of the objects may be directly displayed for viewing by the user via a user interface of a user device, such as a smart phone or a head-worn device, showing a live view of the environment of the user. Thus, users may more readily associate the translated identifier with the object because the translated identifiers may automatically appear to the user as the user is viewing the object and the user does not have to shift their attention from viewing the object to view a translation of an identifier of the object displayed on a computing device. Further, users may avoid inefficiencies caused by existing systems where the user views an object in their environment, shifts their attention away from the environment to provide input to a translation application executing on a user device, and then obtains the translation of the identifier of the object. In these situations, the possibility for translation errors in existing systems increases due to errors in the user input provided to obtain the translation of the identifier of the object.

Other technical features may be readily apparent to one skilled in the art from the following figures, descriptions, and claims.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
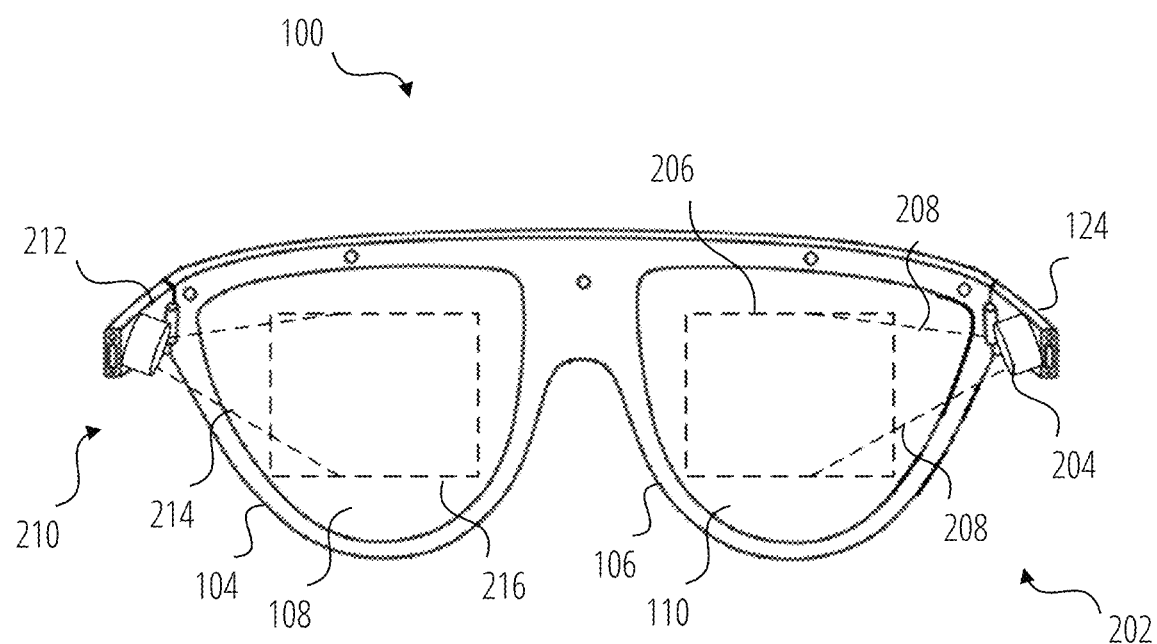
FIG. 2 is a further view of the head-worn device of FIG. 1, in accordance with one or more examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., mobile device 1050 illustrated in FIG. 10), and/or hand movements, locations, and positions detected by the glasses 100.

Figure 3:
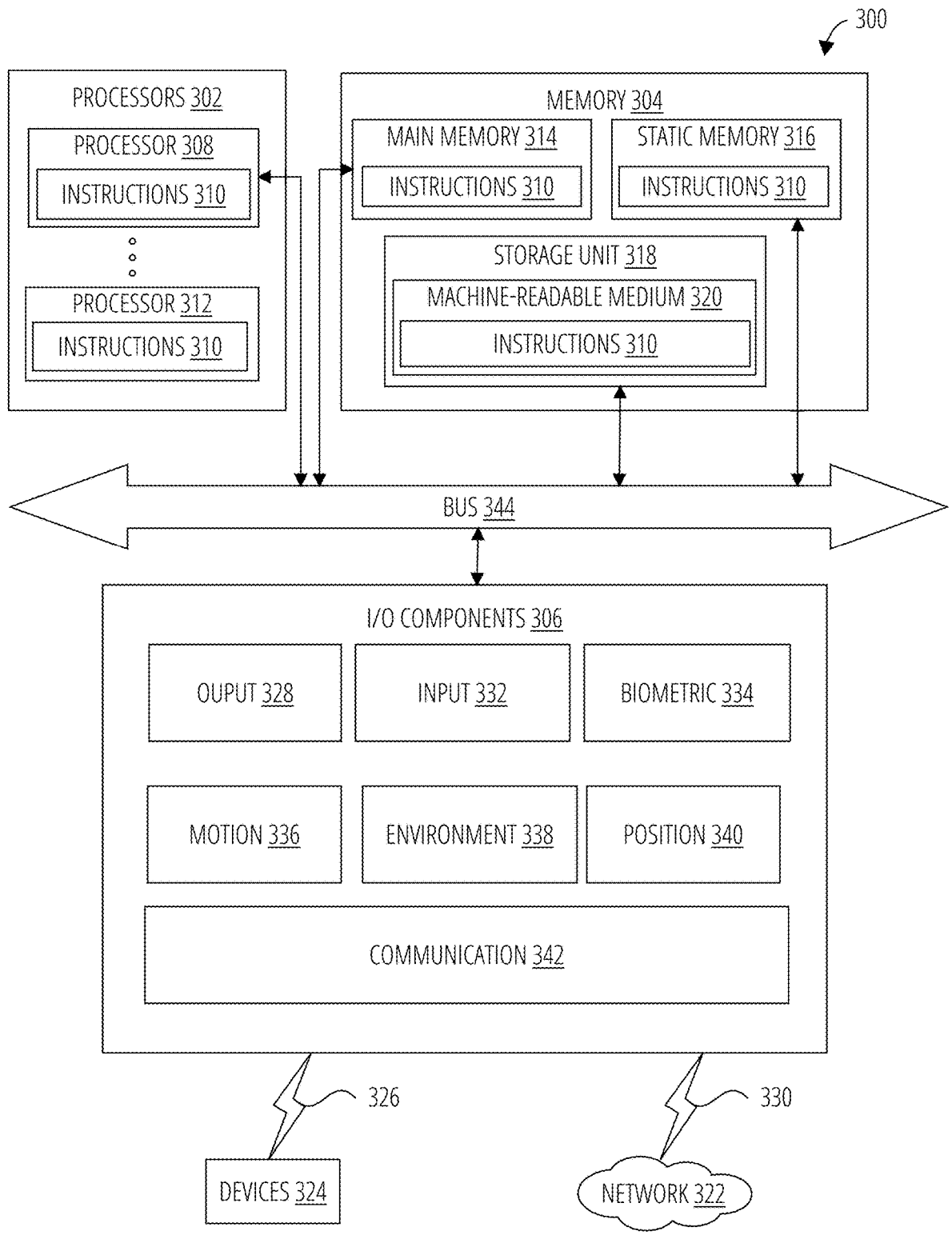
FIG. 3 is a diagrammatic representation of a machine, in the form of a computing apparatus within which a set of instructions may be executed for causing the machine to perform any one or more of the methodologies discussed herein in accordance with one or more examples.

FIG. 3 is a diagrammatic representation of a computing apparatus 300 within which instructions 310 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 310 may cause the computing apparatus 300 to execute any one or more of the methods described herein. The instructions 310 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the computing apparatus 300. Further, while a single computing apparatus 300 is illustrated, the term "machine" may also be taken to include a collection of machines that individually or jointly execute the instructions 310 to perform any one or more of the methodologies discussed herein.

The computing apparatus 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the computing apparatus 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 306 may include biometric components 334, motion components 336, environmental components 338, and position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units, acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 306 further include communication components 342 operable to couple the computing apparatus 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
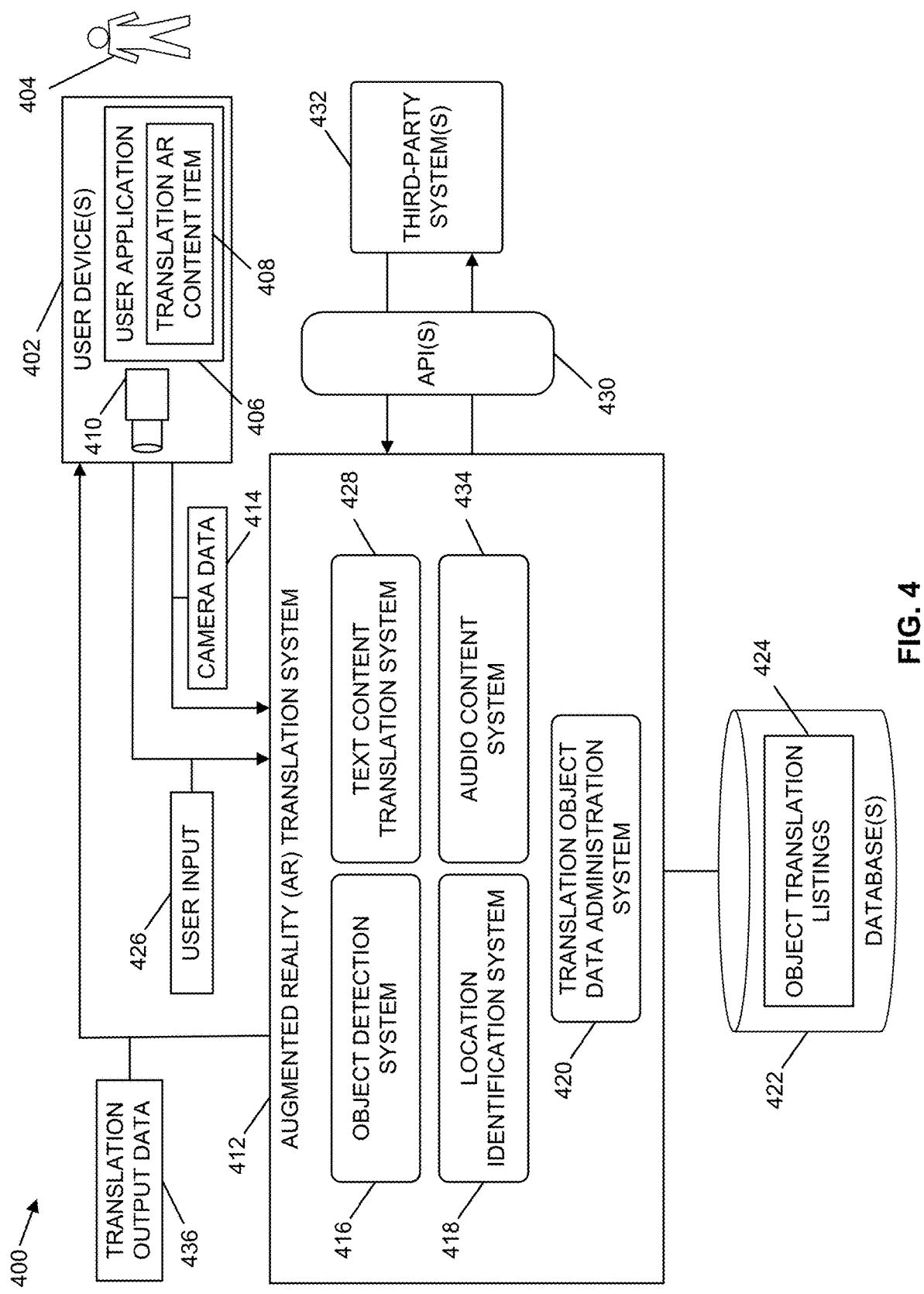
FIG. 4 is a diagram of a computational architecture including one or more systems to generate augmented reality content that includes translations of identifiers of objects located in an environment, in accordance with one or more examples.

FIG. 4 is a diagram of a computational architecture 400 including one or more systems to generate augmented reality content that includes translations of identifiers of objects located in an environment, in accordance with one or more examples. The computational architecture 400 may include one or more user devices 402. The one or more user devices 402 may be operated by a user 404. The one or more user devices 402 may include a number of computing devices having processing resources and memory resources. For example, the one or more user devices 402 may include at least one of a head-worn device, a wearable device, or a mobile computing device, such as a smart phone, tablet computing device, laptop computing device, portable gaming device, and the like. In one or more illustrative examples, a wearable device may include a computing device worn on a portion of a body of a user, such as jewelry, a wrist-worn device, contact lenses, hearing aids, or one or more combinations thereof. In various examples, the one or more user devices 402 may include multiple computing devices that operate in conjunction with one another. To illustrate, the one or more user devices 402 may include a head-worn device that operates in conjunction with at least one of a wearable device or a mobile computing device. In one or more additional examples, the one or more user devices 402 may include a wearable device that operates in conjunction with a mobile computing device. In one or more illustrative examples, the one or more user devices 402 include the glasses 100 of FIG. 1.

The processing resources and the memory resources of the one or more user devices 402 may execute a number of applications, such as user application 406. In one or more examples, the user application 406 may include messaging functionality that enables the user 404 to send messages to and receive messages from other users of the user application 406. In one or more additional examples, the user application 406 may include social networking functionality that enables the user 404 to share content with other users of the user application 406 and/or to access content created by other users of the user application 406. In one or more illustrative examples, the user application 406 includes at least one of the interaction client 1104 or the application 1106 described in more detail with respect to FIG. 11.

The one or more user devices 402 may also execute a translation AR content item 408. The translation AR content item 408 may include software code that is executable within the user application 406. For example, the translation AR content item 408 may include computer-readable instructions that are executable to perform a number of functions within the user application 406. In various examples, the translation AR content item 408 may be executed after instantiating an instance of the user application 406. In the illustrative example of FIG. 4, the translation AR content item 408 is executable to cause augmented reality content to be displayed that corresponds to the translation of identifiers of objects in real-world scenes. In one or more examples, an account of the user 404 with respect to the user application 406 may be associated with a plurality of AR content items. Individual AR content items may be executable to perform different sets of functions to produce augmented reality content within the user application 406. In at least some examples, a set of AR content items associated with an account of the user 404 that corresponds to the user application 406 may be displayed in an array of user interface elements that are individually selectable to execute a respective AR content item. In one or more illustrative examples, an array of user interface elements that corresponds to a number of augmented reality content items is displayed in a carousel arrangement.

The one or more user devices 402 may also include one or more cameras, such as camera 410. Camera 410 may capture images of real-world scenes in an environment in which the one or more user devices 402 are located. In one or more examples, the camera 410 may capture video content of real-world scenes of an environment in which the one or more user devices 402 are located. The video content may comprise at least one of a series of images or a stream of images captured during a period of time. In various examples, the camera 410 may capture video of a real world scene in response to input from the user 404. The images captured by the camera 410 may be within a field of view of the camera 410. The field of view may correspond to a portion of a real-world scene of an environment that may be imaged by the camera 410 at a given time and may be based on focal length of a lens of the camera 410 and a size of a sensor of the camera 410. In at least some examples, the camera 410 may capture a live/current view of a real world scene within the field of view. Although not shown in the illustrative example of FIG. 4, the one or more user devices 402 may also include a number of audio capture devices. To illustrate, the one or more user devices 402 may include a number of microphones to capture audio content produced in an environment in which the one or more user devices 402 are located. In one or more illustrative examples, the one or more user devices 402 include one or more microphones to capture audio content in conjunction with video content captured by the camera 410. The one or more user devices 402 may also include one or more speakers to play audio content that corresponds to augmented reality content displayed within the translation AR content item 408.

The computational architecture 400 also includes an augmented reality (AR) translation system 412. The AR translation system 412 may analyze data generated by the one or more cameras 410 of the one or more user devices 402 to determine objects located in a real-world scene. The AR translation system 412 may determine translations of identifiers of the objects and cause the translations to be displayed in a user interface that includes a view of a real-world scene in which the objects are located. In at least some examples, the view of the real-world scene may include a live view of a real-world scene. In one or more illustrative examples, an identifier of an object includes at least one of one or more words, one or more symbols, one or more characters, or one or more phrases that are used to identify the object in at least one language. In one or more additional illustrative examples, an identifier of an object includes at least one of nouns or adjectives that correspond to the object. In various examples, the AR translation system 412 may generate augmented reality content indicating an identifier of an object according to a first language and a translation of the identifier of the object in a second language.

The AR translation system 412 may include an object detection system 416 that analyzes camera data 414 captured by the camera 410 to determine one or more objects located in a real-world scene. In various examples, the object detection system 416 may implement one or more machine learning algorithms to identify objects indicated by the camera data 414. In one or more examples, the object detection system 416 may implement one or more artificial neural networks to analyze the camera data 414 to identify objects within a real-world scene. To illustrate, the object detection system 416 implements one or more convolutional neural networks to identify an object indicated by the camera data 414. In addition, the object detection system 416 may implement one or more residual neural networks to determine that an object is indicated by the camera data 414. In one or more further examples, the object detection system 416 may implement at least one of a k-nearest neighbor artificial neural network, a support vector machine algorithm, or a random forests algorithm to identify an object indicated by the camera data 414. In at least some examples, one or more machine learning algorithms implemented by the object detection system 416 may be trained according to a training data set that includes at least one of image content or video content of a number of different objects. In addition, the object detection system 416 may implement one or more classification machine learning techniques to analyze the camera data 414 to identify one or more objects in a real-world scene. To illustrate, the object detection system 416 may implement one or more support vector machines with respect to the camera data 414 to identify one or more objects in a real-world scene.

In one or more illustrative examples, the object detection system 416 analyzes the camera data 414 to determine a number of at least one of contours, edges, colors, shades, textures, or shapes that may be used to determine one or more candidate regions that may include one or more objects of interest. The object detection system 416 may also implement a convolutional neural network to extract features from the one or more candidate regions. Additionally, the object detection system 416 may implement one or more support vector machines to classify one or more objects included in the one or more candidate regions based on the features extracted from the one or more candidate regions by the convolutional neural network. In various examples, the one or more machine learning techniques implemented by the object detection system 416 may be training using previously captured images that include one or more of the objects of interest and are labeled as including the one or more objects of interest.

In one or more additional illustrative examples, the object detection system 416 implements one or more gaze tracking techniques to determines a location of a field of view of the gaze of the user 404. In at least some examples, the object detection system 416 may analyze the camera data 414 to determine a location of a gaze of the user 404. Additionally, the object detection system 416 may analyze data obtained from one or more inertial measurement unit (IMU) sensors of the one or more user devices 402 to determine a location of a gaze of the user 404. Further, the object detection system 416 may analyze additional camera data obtained from one or more cameras external to the one or more user devices 402 to determine a location of a gaze of the user 404. In one or more illustrative examples, the object detection system 416 determines at least one of a field of view of the user 404 or a center of the field of view of the user 404. Responsive to determining at least one of a field of view of the user 404 or a center of the field of view of the user 404, the object detection system 416 may identify one or more objects included in the field of view of the user 404 and/or one or more objects included in the center of the field of view of the user 404. In one or more examples, as the gaze of the user 404 changes, the object detection system 416 may determine a new location of the field of view of the gaze of the user 404. The object detection system 416 may then determine one or more additional objects included in at least one of the new field of view of the user 404 or one or more additional objects included in a center of the new field of view of the user 404.

The AR translation system 412 may also include a location identification system 418. The location identification system 418 may determine a location of the one or more user devices 402. In one or more examples, the location identification system 418 may determine a location of the one or more user devices 402 based on geographic positioning system (GPS) data obtained from the one or more user devices 402. In one or more additional examples, the location identification system 418 may determine a location of the one or more user devices 402 based on an internet protocol address of the one or more user devices 402. In one or more further examples, the location identification system 418 may determine a location of the one or more user devices 402 based on triangulation data obtained from one or more wide area wireless communication networks that correspond to the one or more user devices 402.

Additionally, the location identification system 418 may determine a location of the one or more user devices 402 by analyzing the camera data 414. In various examples, the location identification system 418 may determine a location of the one or more user devices 402 based on an arrangement of objects in a real-world scene. For example, the object detection system 416 may determine a number of objects in a real-world scene and spatial relationships between the number of objects. In at least some examples, the object detection system 416 may determine real-world coordinates of individual objects of the number of objects. In one or more additional examples, the object detection system 416 may determine a distance between objects included in the number of objects of the real-world scene. In one or more further examples, the object detection system 416 may determine a directional indicator that indicates a direction or heading between objects of the number of objects included in the real-world scene.

In one or more illustrative examples, the location identification system 418 classifies an arrangement of objects in a real-world scene as being a part of a respective location. In various examples, the respective location of the arrangement of objects may correspond to an identifier. In one or more examples, an identifier of a location of the arrangement of objects may be provided by the user 404. In one or more additional examples, an identifier of a location of the arrangement of object may be provided by the location identification system 418. In at least some examples, the location identification system 418 may store an arrangement of objects in a real-world scene in conjunction with a location based on input from the user 404 indicating that the arrangement of objects is to be stored in conjunction with a location and that a translation of an identifier of at least one object in the arrangement of objects has been requested or has previously been determined.

In addition, the AR translation system 412 may include a translation object data administration system 420. The translation object data administration system 420 may cause information related to objects included in a real-world scene to be stored in one or more databases 422. The one or more databases 422 may be at least one of physically or logically connected to the AR translation system 412. The one or more databases 422 may be at least one of locally or remotely located with respect to one or more computing devices implementing the AR translation system 412. In at least some examples, the one or more databases 422 and the AR translation system 412 may be implemented as part of a cloud-based computing architecture.

The one or more databases 422 may store object translation listings 424. The object translation listings 424 may indicate objects that correspond to users of the user application 406 having identifiers that have been translated from a first language to a second language. For an individual object, the object translation listings 424 may indicate at least one of an identifier of the object in a first language and an identifier of the object in a second language. In one or more additional examples, the object translation listings 424 may indicate default languages of users of the user application 406 and one or more additional languages that are used to generate translations of identifiers of objects. The object translation listings 424 may also indicate a location of objects having identifiers that have been translated from a first language to a second language.

In one or more illustrative examples, the translation object data administration system 420 causes information related to objects having identifiers translated from at least one language to another language to be stored in and retrieved from one or more object translation listings 424 of users of the user application 406, such as the user 404. For example, as the user 404 moves through an environment, the object detection system 416 may analyze the camera data 414 to identify one or more objects in the environment. The object detection system 416 may operate in conjunction with the translation object data administration system 420 to determine whether or not the object is included in an object translation listing 424 of the user 404. In various examples, the object detection system 416 may generate at least one of a classification or a tag identifying an object detected in a real-world scene and provide the classification and/or tag to the translation object data administration system 420. The translation object data administration system 420 may then use the classification and/or tag of the object and query an object translation listing 424 of the user 404 with respect to at least one of the classification or tag of the object.

In scenarios where an object is absent from an object translation listing 424 of the user 404, the AR translation system 412 provides one or more options to the user 404 to add the object to an object translation listing 424 of the user 404. For example, responsive to determining that an object identified by the object detection system 416 is absent from an object translation listing 424 of the user 404, the AR translation system 412 may cause one or more user interface elements to be displayed that are selectable to add the object to an object translation listing 424 of the user 404. In one or more illustrative examples, the one or more user interface elements are displayed as augmented reality content in a user interface that displays a view of a real-world scene that includes the object. In various examples, in response to selection of a user interface element, the one or more user devices 402 may provide user input 426 to the AR translation system 412 to add an object identified by the object detection system 416 to an object translation listing 424 of the user 404. In at least some examples, the one or more options to add the object to an object translation listing 424 of the user may correspond to an option to translate an identifier of the object from a first language to a second language. To illustrate, in response to selection of a user interface element to obtain a translation of an identifier of the object, the AR translation system 412 causes the object to be added to an object translation listing 424 of the user 404.

In situations where the object is stored in an object translation listing 424 of the user 404, the translation object data administration system 420 may operate in conjunction with at least one of the object detection system 416 or a text content translation system 428 to generate a translation of an identifier of the object from a first language to a second language. In one or more examples, in response to the object detection system 416 identifying the presence of an object in a real-world scene captured by the camera 410, the translation object data administration system 420 may obtain a translation of an identifier of the object stored in the one or more databases 422. In various examples, the translation of the identifier of the object may be stored in or in conjunction with an object translation listing 424 of the user 404.

In one or more additional examples, in response to the object detection system 416 identifying the presence of an object in a real-world scene captured by the camera 410, the text content translation system 428 may generate a translation of an identifier of the object. In various examples, the text content translation system 428 may determine a first identifier of the object in a first language. In at least some examples, the first identifier of the object may be in a default language. The default language may be selected by the user 404. Additionally, the default language may be determined based on a location of the user 404. Further, the default language may be determined by an entity that at least one of maintains, controls, or administers the AR translation system 412. The text content translation system 428 may translate the first identifier to one or more second identifiers in one or more second languages. In one or more examples, at least one of the one or more second languages may be selected by the user 404.

The text content translation system 428 may implement one or more computational algorithms to generate translations of identifiers of objects located in real-world scenes. In various examples, the text content translation system 428 may implement one or more machine learning techniques to generate translations of identifiers of objects. For example, the text content translation system 428 may implement one or more artificial neural networks to generate translations of identifiers of objects. In one or more illustrative examples, the text content translation system 428 implements one or more recurrent neural networks to generate translations of identifiers of objects. In one or more additional illustrative examples, the text content translation system 428 implements one or more convolutional neural networks to generate translations of identifiers of objects.

The text content translation system 428 may also generate translations of identifiers of objects using calls of one or more application programming interfaces (APIs) 430 to obtain translations from one or more third-party systems 432. In one or more examples, the text content translation system 428 may determine an identifier of an object detected by the object detection system 416 in a first language and generate one or more calls of the one or more APIs 430 to request a translation of the identifier in one or more second languages. The text content translation system 428 may obtain the translation of the identifier of the object in the one or more second languages from the one or more third-party systems 432. In at least some examples, the one or more third-party systems may include one or more translation services that are at least one of controlled, maintained, or administered by an entity that is different from an entity that at least one of controls, maintains, or administers the AR translation system 412.

In one or more examples, the text content translation system 428 may generate text content that includes translations of identifiers of objects detected by the object detection system 416. In various examples, the text content translation system 428 may generate augmented reality content that is displayed in a user interface that includes a view of a real-world scene that includes one or more objects that correspond to text translated text. In at least some examples, augmented reality content generated by the text content translation system 428 may be rendered by the translation AR content item 408 that is executing within the user application 406. In one or more illustrative examples, text content generated by the text content translation system 428 includes an identifier of an object in a first language and one or more additional translations of the identifier in one or more second languages. The text content translation system 428 may cause an identifier of an object in a first language and translations of the identifier in one or more second languages to be displayed in proximity to the object. In at least some examples, user interface elements that correspond to translations of identifiers of objects may comprise virtual objects that may be manipulated and/or controlled by the user 404.

The AR translation system 412 may also include an audio content system 434. The audio content system 434 may generate audio content that corresponds to translations of identifiers of objects detected by the object detection system 416. In one or more examples, the audio content system 434 may generate audio content that corresponds to one or more pronunciations of an identifier of an object in a second language that corresponds to the translation of the identifier of the object in a first language. In one or more additional examples, the audio content system 434 may generate audio content that corresponds to a first pronunciation of a first identifier of an object in a first language and a second pronunciation of a second identifier of the object in a second language. In various examples, audio content generated by the audio content system 434 for an object may be played in conjunction with the display of text content generated by the text content translation system 428 for the object.

In one or more examples, the audio content system 434 may generate audio files having audio content that corresponds to pronunciations of identifiers of objects based on text content generated by the text content translation system 428. The audio content system 434 may implement one or more computational techniques to convert text generated by the text content translation system 428 to audio content. For example, the audio content system 434 may implement one or more Hidden Markov models to generate audio content based on text content of translations generated by the text content translation system 428. In one or more additional examples, the audio content system 434 may implement at least one of one or more convolutional neural networks, one or more recurrent neural networks, or at least one long short term memory to generate audio content based on text content of translations generated by the text content translation system 428. In one or more further examples, the audio content system 434 may implement at least one of one or more encoders, one or more decoders, or one or more vocoders to generate audio content based on text content generated by the text content translation system 428. In still additional examples, the audio content system 434 may implement one or more transformer-based machine learning techniques to generate audio content based on text content generated by the text content translation system 428.

The AR translation system 412 may generate translation output data 436 that is made accessible to the one or more user devices 402. The translation output data 436 may include at least one of text content generated by the text content translation system 428 or audio content generated by the audio content system 434. For example, the translation output data 436 may include text content that corresponds to one or more translations of identifiers of objects located in a view of a real-world scene captured by the camera 410 and audio content that corresponds to audible pronunciations of the one or more translations. The translation output data 436 may include augmented reality content that includes text content generated by the text content translation system 428 and audio content generated by the audio content system 434. In various examples, the AR translation system 412 may generate at least one of image content, video content, or animation content based on at least one of the text content generated by the text content translation system 428 or audio content generated by the audio content system 434. To illustrate, the AR translation system 412 may generate one or more animations that are displayed in relation to one or more objects included in a real-world scene where the one or more animations include at least one of the text content generated by the text content translation system 428 or audio content generated by the audio content system 434.

Augmented reality content included in the translation output data 436 may be accessed via one or more output devices of the one or more user devices 402. To illustrate, audio content included in the translation output data 436 may be accessed via speakers of the one or more user devices 402 and at least one of text content, image content, video content, or animation content included in the translation output data 436 may be accessed via one or more display devices of the one or more user devices 402. In one or more illustrative examples, at least one of text content, image content, video content, or animation content included in the translation output data 436 is displayed in one or more user interfaces generated by the translation AR content item 408. In at least some examples, the one or more user interfaces generated by the translation AR content item 408 based on the translation output data 436 may include a view, such as a live view, of a real-world scene captured by the camera 410 and that includes one or more objects having identifiers translated by the AR translation system 412.

Although a number of operations are described as being performed by the AR translation system 412, at least a portion of the operations described as being performed by the AR translation system 412 may be performed by the one or more user devices 402. For example, one or more operations described as being performed by the object detection system 416, one or operations described as being performed by the location identification system 418, one or more operations described as being performed by the translation object data administration system 420, one or more operations described as being performed by the text content translation system 428, one or more operations described as being performed by the audio content system 434, or one or more combinations thereof, may be performed by the one or more user devices 402 in relation to the user application 406.

Figure 5:
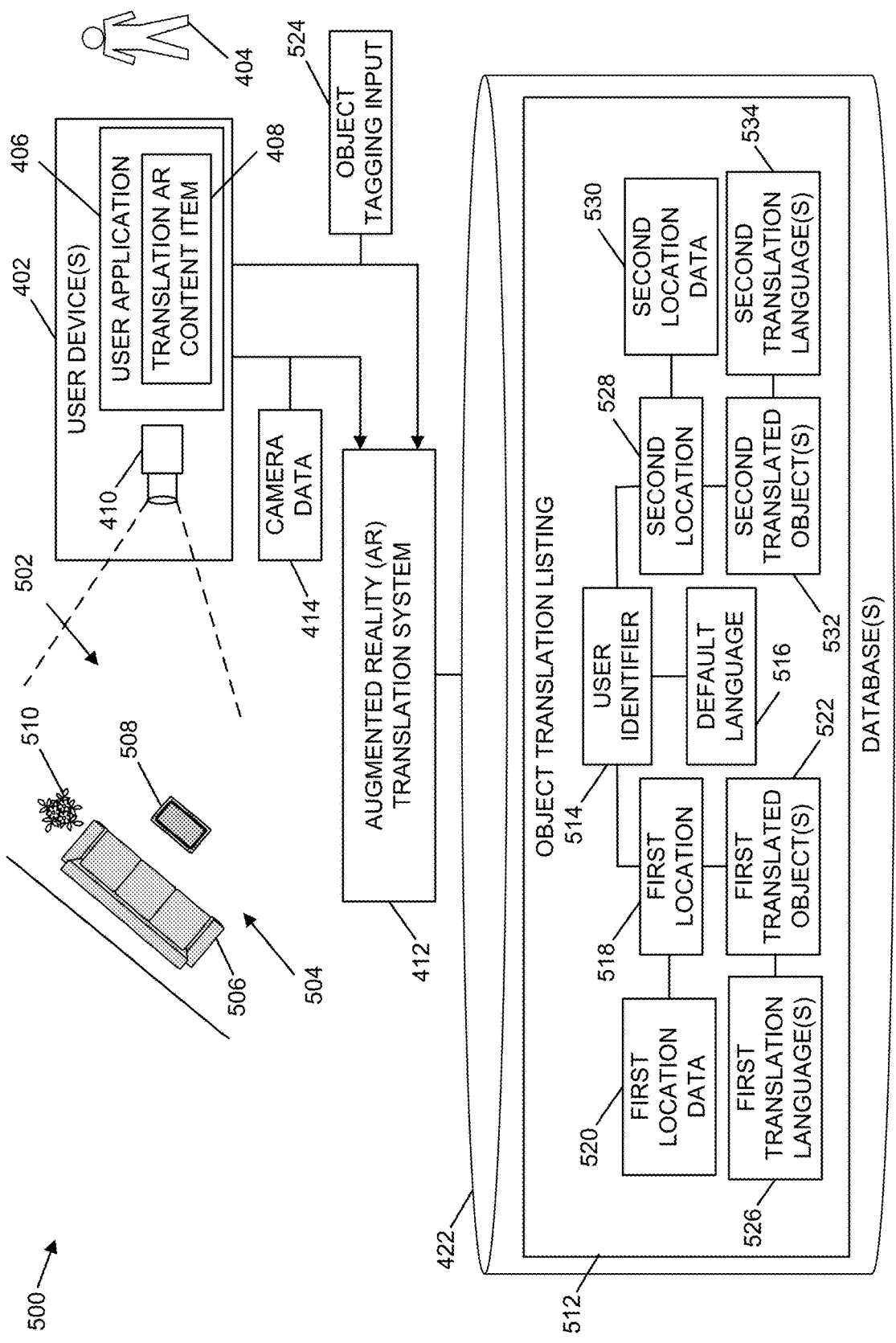
FIG. 5 is a diagram of a computational architecture including one or more systems to track objects that are stored in object translation listings of users of a translation augmented reality content item, in accordance with one or more examples.

FIG. 5 is a diagram of a computational architecture 500 including one or more systems to track objects that are stored in object translation listings of users of a translation augmented reality content item, in accordance with one or more examples. The computational architecture 500 includes the one or more user devices 402 operated by user 404. The computational architecture 500 also includes the AR translation system 412 and the one or more databases 422. The one or more user devices 402 may include one or more cameras, such as the camera 410. The camera 410 may have a field of view 502. The field of view 502 may be based on a positioning of the one or more user devices 402. In one or more examples, the one or more user devices 402 may include a head-worn device and the field of view 502 may be based on the positioning of the head of the user 404. In various examples, the field of view 502 may correspond to a gaze of the user 404.

The field of view 502 may correspond to camera data 414 generated by the camera 410 and that is provided to the AR translation system 412. In the illustrative example of FIG. 5, the camera 410 captures at least one of image content or video content of a real-world scene 504 included in the field of view 502. The real-world scene 504 may include a first object 506, a second object 508, and a third object 510. The objects 506, 508, 510 may be positioned in an arrangement. In at least some examples, the arrangement of the first object 506, the second object 508, and the third object 510 with respect to one another may be indicative of a location of the real-world scene.

In the illustrative example of FIG. 5, the one or more databases 422 store an object translation listing 512 of the user 404. The object translation listing 512 may correspond to a user identifier 514 that corresponds to the user 404. In one or more examples, the user identifier 514 may correspond to an identifier of the user 404 within the user application 406, such as a username, alias, log in identifier, one or more combinations thereof, and the like. In these scenarios, the user identifier 514 is selected by the user 404. The user identifier 514 may also correspond to at least one of one or more symbols or one or more characters assigned to the user 404 by an entity that at least one of maintains, administers, or controls the AR translation system 412 to identify the user 404 within the AR translation system 412 and within other systems that operate in conjunction with the user application 406. In at least some examples, the user identifier 514 is used to store data of the user 404 and retrieve data of the user 404 with respect to the one or more databases 422.

The user identifier 514 may correspond to a default language 516. In one or more examples, the default language 516 may be selected by the user 404. In one or more additional examples, the default language 516 may be determined based on a location of the user 404, such as a language commonly used for communication in the location of the user 404. In one or more further examples, the default language 516 may be selected by an entity that at least one of controls, administers, or maintains the user application 406. In at least some examples, the default language 516 may be modified. For example, the default language 516 may be modified by the user 404 and/or modified based on a change of location of the user 404. In various examples, the default language 516 corresponds to a language commonly used by the user 404 to communicate with other users of the user application 406 and/or a language in which the user 404 is fluent with regard to at least one of spoken communications or written communications.

The user identifier 518 may be associated with a first location 518 that corresponds to first location data 520. In one or more examples, the first location data 520 may indicate the first location 518 based on GPS location data. The first location data 520 may also indicate the first location 518 based on a first arrangement of objects included in the first location 518. For example, the first location data 520 may indicate real-world coordinates for an arrangement of objects that corresponds to the first location 518. In one or more illustrative examples, the first location data 520 indicate a first real-world coordinates of the first object 506, second real-world coordinates of the second object 508, and third real-world coordinates of the third object 510 that corresponds to a location of the user 404.

One or more components of the AR translation system 412, such as the location identification system 418 described with respect to FIG. 4, may determine a location of the user 404 based on the first location data 520. For example, the location identification system 418 may analyze current location data obtained from the user device 402 with respect to the first location data 520 to determine whether or not the user 404 is located in the first location 518. In one or more examples, the AR translation system 412 may obtain current GPS coordinates from the one or more user devices 402 and analyze the current GPS coordinates with respect to GPS coordinates included in the first location data 520. In situations where the current GPS coordinates corresponds to the GPS coordinates included in the first location data 520, the AR translation system 412 may determine that the user 404 is located in the first location 518. In at least some examples, the AR translation system 412 may determine a quantitative measure indicating an amount of similarity between the current GPS coordinates obtained from the one or more user devices 402 and GPS coordinates included in the first location data 520. In various examples, the AR translation system 412 may determine that the user 404 is located in the first location 518 in response to the quantitative measure of similarity being at least a threshold value. To illustrate, the AR translation system 412 determines that the user 404 is located in the first location 518 in response to determining that the current GPS coordinates obtained from the one or more user devices 402 are within at least 80%, at least 85%, at least 90%, at least 95%, at least 97%, or at least 99% of the GPS coordinates included in the first location data 520.

Additionally, the AR translation system 412 may analyze the camera data 414 to determine an arrangement of objects in a current location of the user 404 and analyze the arrangement of objects with respect to a first arrangement of objects included in the first location data 520. In various examples, the AR translation system 412 may analyze at least one of a number of objects in the current location of the user 404, positioning of objects with respect to one another in the current location of the user 404, or distances between objects in the current location of the user 404 with respect to a number of first objects included in the first location 518 of the user 404, positioning of first objects in relation to one another included in the first location data 520 and/or with respect to distances between first objects included in the first location data 520. In scenarios where the first object 506, the second object 508, and the third object 510 are included in the first location data 520, the AR translation system 412 analyzes an arrangement of objects included in the camera data 414 to determine a quantitative measure indicating an amount of similarity between the arrangement of objects included in the camera data 514 and the arrangement of the first object 506, the second object 508, and the third object 510 with respect to one another.

In one or more illustrative examples, the AR translation system 412 analyzes real-world coordinates of objects indicated by the camera data 414 with respect to first real-world coordinates of the first object 506, second real-world coordinates of the second object 508, and third real-world coordinates of the third object 510. For example, in situations where the current location of the user 404 includes three objects, the AR translation system 412 may analyze real-world coordinates of individual objects indicated by the camera data 414 with respect to real-world coordinates of the first object 506, real-world coordinates of the second object 508, and real-world coordinates of the third object 510 to determine whether or not the respective sets of real-world coordinates correspond to one another. In situations where the camera data 414 includes an object having real-world coordinates with at least a threshold amount of similarity with respect first real-world coordinates of the first object 506, another object having real-world coordinates with at least at threshold amount of similarity with respect to second real-world coordinates of the second object 508, and an additional object having real-world coordinates with at least a threshold amount of similarity with respect to third real-world coordinates of the third object 510, the AR translation system 412 determines that the current location of the user 404 corresponds to the first location 518. In at least some examples, real-world coordinates of objects included in the camera data 414 may have a threshold amount of similarity with objects included in the first location data 520 when the real-world coordinates of individual objects included in the camera data 414 are within at least 80%, at least 85%, at least 90%, at least 95%, at least 97%, or at least 99% of real-world coordinates of respective objects included in the first location data 520.

In one or more examples, the AR translation system 412 may analyze a combination of GPS coordinates and the camera data 414 to determine the location of the user 404. For example, the AR translation system 412 may determine a first quantitative measure indicating an amount of similarity between current GPS coordinates of the one or more user devices 402 and GPS coordinates included in the first location data 520 and a second quantitative measure indicating an amount of similarity between an arrangement of objects indicated by the camera data 414 and an additional arrangement of objects included in the first location data 520. In scenarios where the first quantitative measure corresponds to a first threshold value and the second quantitative measure corresponds to a second threshold value, the AR translation system 412 determines that the user 404 is located in the first location 518.

The first location 518 may also correspond to one or more first translated objects 522. The one or more first translated objects 522 may include one or more objects having identifiers that have been translated on behalf of the user 404. In at least some examples, the one or more first translated objects 522 may be associated with the first location 518 in the one or more databases 422 according to a first tag that corresponds to the first location 518. In one or more examples, the AR translation system 412 may obtain object tagging input 524 from the one or more user devices 402 indicating a request by the user 404 to translate an identifier of an object from the default language 516 to one or more first translation languages 526. To illustrate, as the second object 508 moves into the field of view 502 of the camera 410, the AR translation system 412 determines that the user 404 is located in the first location 518 and that the second object 508 is absent from the one or more first translated objects 522. The AR translation system 412 may then cause one or more user interface elements to be displayed by the user application 406 that are selectable by the user 404 to generate a translation of an identifier of the second object 508. In response to selection of a user interface element to generate a translation of the identifier of the second object 508, the object tagging input 524 is provided to the AR translation system 412. Responsive to the object tagging input 524, the AR translation system 412 causes an identifier of the second object 508 to be translated from the default language 516 to one or more additional languages. The AR translation system 412 may then add the second object 508 to the one or more first translated objects 522. In instances where the one or more additional languages are included in the one or more first translation languages, the AR translation system 412 may indicate at least a portion of the one or more first translation languages 526 that correspond to the second object 508. In scenarios where the one or more additional languages are absent from the first translation languages 526, the AR translation system 412 may add the one or more additional languages to the first translation languages 526 and indicate that the second object 508 corresponds to the one or more additional languages added to the first translation languages 526.

In various examples, one or more translations for the one or more first translated objects 522 may be stored in the one or more databases 422. In these situations, the AR translation system 412 retrieves a translation of an identifier of a first translated object 522 from the one or more databases 422 in response to detecting that the user 404 is located in the first location 518 and that the one or more first translated object 522 is in the field of view 502 of the camera 410. In one or more additional examples, one or more translations for the first translated objects 522 may be retrieved from one or more translation services, such as one or more third-party translation services. In these scenarios, the AR translation system 412 may generate one or more requests, such as one or more API calls, to obtain a translation of a first translated object 522 from the default language 516 to one or more first translation languages 526 in response to the AR translation system 412 determining that the user 404 is located in the first location 518 and that the first translated object 522 is in the field of view 502 of the camera 410.

In the illustrative example of FIG. 5, the user identifier 514 corresponds to a second location 528 that is different from the first location 518. The second location 528 may correspond to second location data 530. The second location data 530 may include at least one of GPS coordinates or an arrangement of objects that correspond to the second location 528. Additionally, the second location 528 may correspond to second translated objects 532 that correspond to one or more objects having identifiers for which the user 404 has requested a translation. Further, the second translated objects 532 may correspond to one or more second translation languages 534. The one or more second translation languages 534 may be different from the one or more first translated objects 522. In one or more additional examples, the one or more second translation languages 534 may be the same as the one or more first translation languages 526.

Although the illustrative example of FIG. 5 indicates that the user identifier 514 corresponds to a first location 518 and a second location 528, in one or more additional examples, the user identifier 514 may correspond to fewer locations. In one or more additional examples, the user identifier 514 may correspond to a greater number of locations than the first location 518 or the second location 528.

Figure 6:
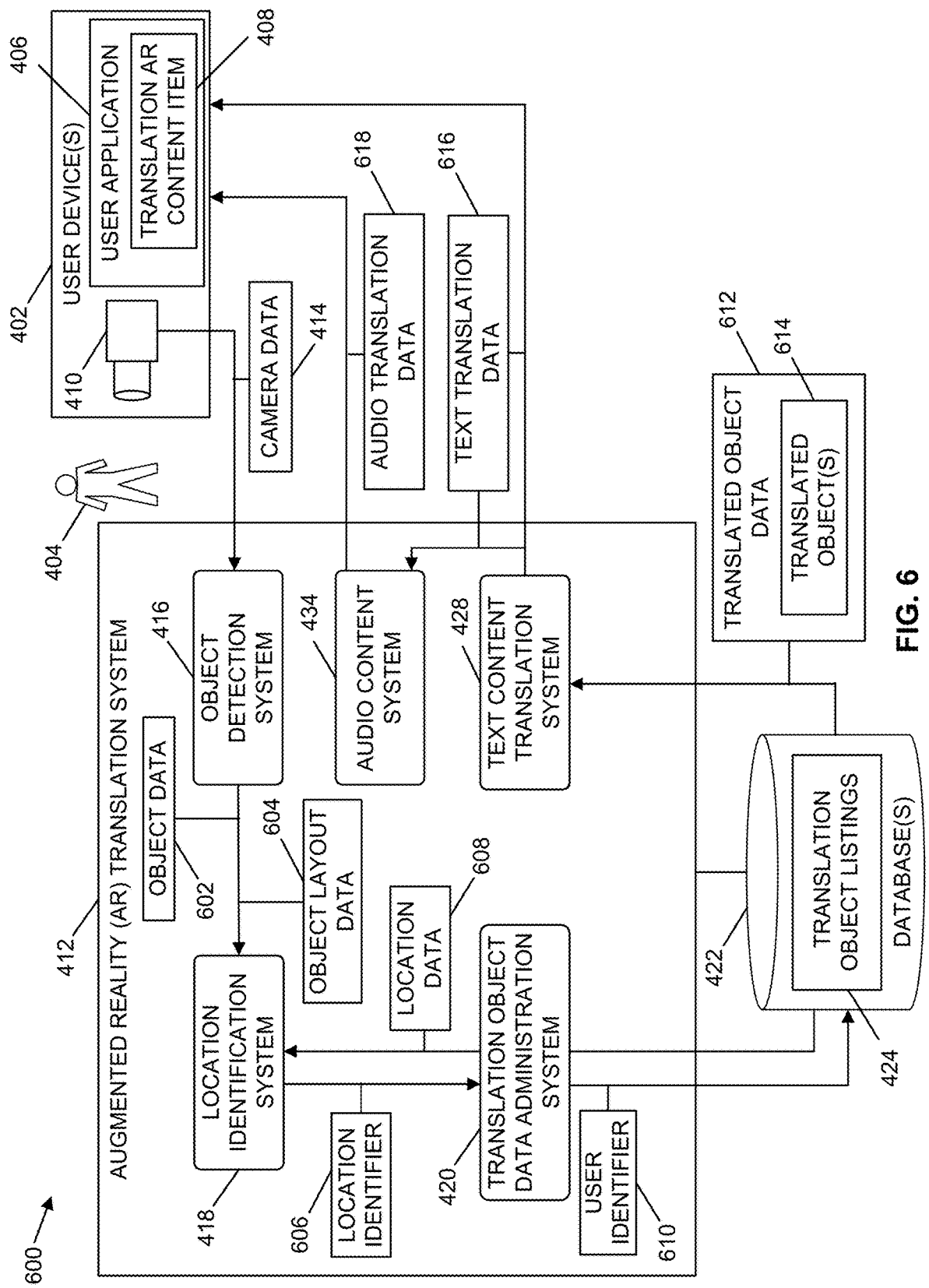
FIG. 6 is diagram of a computational architecture to generate augmented reality content that includes text content and audio content of identifiers of objects that have been translated from a first language to a second language, in accordance with one or more examples.

FIG. 6 is diagram of a computational architecture 600 to generate augmented reality content that includes text content and audio content of identifiers of objects in one or more languages, in accordance with one or more examples. The computational architecture 600 may include the one or more user devices 402 operated by the user 404. The one or more user devices 402 may include the camera 410 that generates camera data 414 that is accessible by the AR translation system 412. The camera data 414 may include at least one of image content or video content of a real-world scene. In at least some examples, the camera data 414 may include a stream of data captured by the camera 410. In various examples, the camera data 414 may correspond to a live view of a real-world scene. The one or more user devices 402 may also execute an instance of the user application 406 with the translation AR content item 408 being executed within the instance of the user application 406

The object detection system 416 may analyze the camera data 414 and determine object data 602. The object data 602 may indicate one or more objects located within a field of view of the camera 410. In one or more examples, the object detection system 416 may determine a center region of the field of view of the camera 410 and at least a portion of the object data 602 may indicate one or more objects included in a center of the field of view of the camera 410. The object detection system 416 may also analyze the camera data 414 to generate object layout data 604. The object layout data 604 may indicate an arrangement of objects included in the camera data 414. For example, the object layout data 604 may indicate a spatial arrangement of objects included in a real-world scene that corresponds to the camera data 414. In one or more examples, the object layout data 604 may indicate real-world coordinates of one or more objects located in a real-world scene. In one or more additional examples, the object layout data 604 may indicate distances between objects included in a real-world scene and angles and/or vectors indicating the spatial arrangement of objects with respect to one another in the real world scene.

In one or more examples, the location identification system 418 may analyze at least one of the object data 602, the object layout data 604, or GPS coordinates obtained from the one or more user devices 402 to determine a location identifier 606. The location identifier 606 may indicate a location of the user 404. The location identification system 418 may operate in conjunction with the translation object data administration system 420 to access location data 608. In various examples, the translation object data administration system 420 may retrieve the location data 608 from a translation object listing 424 of the user 404 based on a user identifier 610. In at least some examples, the translation object data administration system 420 may use the user identifier 610 to retrieve at least one of GPS coordinates or object arrangement data from a translation object listing 424 of the user 404.

In at least some examples, the location identification system 418 may analyze the location data 608 accessed via the one or more databases 422 with respect to current location data accessed via the one or more user devices 402 to determine a location of the user 404. In various examples, the location identification system 418 may analyze current GPS coordinates accessed via the one or more user devices 402 with respect to one or more sets of GPS coordinates that correspond to one or more locations and that are included in the location data 608 to determine a location of the user 404. In one or more additional examples, the location identification system 418 may analyze an arrangement of objects in a real-world scene indicated by the object layout data 604 with respect to one or more arrangements of objects included in the location data 608. In response to determining at least a threshold level of similarity between at least a portion of the location data 608 and at least one of the object layout data 604 or additional location data accessed via the one or more user devices 402, the location identification system 418 determines the location identifier 606 that corresponds to the location of the user 404.

The translation object data administration system 420 may use the location identifier 606 to generate translated objects data 612. The translated objects data 612 may indicate one or more translated objects 614 that correspond to the location of the user 404. The one or more translated objects 614 may correspond to one or more objects stored in a translation object listing 424 of the user 404 for which the user 404 has requested a translation of an object identifier. In one or more examples, the translated object data 612 may include one or more identifiers of the one or more translated objects 614. The one or more identifiers of the one or more translated objects 614 may correspond to at least one of one or more symbols or one or more characters that identify the one or more translated objects 614. In one or more illustrative examples, the one or more identifiers of the one or more translated objects 614 uniquely identify individual objects of the one or more translated objects 614. In one or more additional illustrative examples, the one or more identifiers of the one or more translated objects 614 correspond to identifiers in a given language that correspond to individual objects of the one or more translated objects 614. For example, the translated object data 612 may indicate respective identifiers of individual objects of the one or more translated objects 614 in a default language. In various examples, the default language may be selected by the user 404.

The translated object data 612 may be provided to the text content translation system 428. The text content translation system 428 may determine translations for identifiers of the one or more translated objects 614. For example, the text content translation system 428 may generate text content corresponding to an identifier of a translated object 614 in an additional language that is different from a default language. The text content translation system 428 may implement one or more computational algorithms to generate the translation of the identifier of the one or more translated objects 614. In one or more additional examples, the text content translation system 428 may obtain the translation of the identifier of the one or more translated objects 614 from one or more translation services. In various examples, the one or more translation services may be at least one of controlled, administered, or maintained by one or more entities that are different from one or more entities that at least one of control, administer, or maintain the AR translation system 412.

The text content translation system 428 may generate text translation data 616. The text translation data 616 may indicate at least one of characters or symbols of one or more identifiers of one or more translated objects 614 in an additional language that is different from a default language. In one or more examples, the additional language may be selected by at least one of the user 404 or an entity that at least one of controls, maintains, or administers the AR translation system 412. In at least some examples, the text translation data 616 may include at least one of nouns or adjectives that correspond to identifiers of the one or more translated objects 614. In one or more illustrative examples, the text translation data 616 includes at least one of one or more first characters or first symbols of a first identifier of a translated object 614 in a default language and at least one of one or more second characters or second symbols of a second identifier of the translated object 614 in an additional language.

The text content translation system 428 may provide the text translation data 616 to the audio content system 434. The audio content system 434 may generate audio translation data 618 based on the text translation data 616. For example, the audio content system 434 may determine pronunciations of one or more identifiers of one or more translated objects 614 included in the text translation data 616. To illustrate, the audio content system 434 uses text content of an identifier included in the text translation data 616 to generate audio translation data 618 that includes an audible pronunciation of the identifier. In one or more illustrative examples, the audio content system 434 generates audio translation data 618 that includes a first audible pronunciation of a first identifier of a translated object 614 in a first language based on first text content of the first identifier included in the text translation data 616. Additionally, the audio content system 434 may generate audio translation data 618 that includes a second audible pronunciation of a second identifier of the translated object 614 in a second language based on second text content of the second identifier included in the text translation data 616. In one or more illustrative examples, the audio translation data 618 includes the first audible pronunciation and the second audible pronunciation. In at least some examples, the first language corresponding to the first pronunciation may be a default language and the second language corresponding to the second pronunciation may be an additional language for which the user 404 has requested translations of identifiers of objects.

In one or more examples, the text content translation system 428 may provide the text translation data 616 to the one or more user devices 402 and the audio content system 434 may provide the audio translation data 618 to the one or more user devices 402. The text translation data 616 and the audio translation data 618 may be accessible via the translation AR content item 408. In one or more examples, the text translation data 616 may comprise augmented reality content that is displayed in conjunction with the translation AR content item 408 and the audio translation data 618 may correspond to the augmented reality content that is played in conjunction with the display of the text translation data 616. In one or more illustrative examples, while a translation of an identifier of an object is displayed in conjunction with the translation AR content item 408 by one or more display devices of the one or more user devices 402, a pronunciation of the translation is played at least once via one or more speakers of the one or more user devices 402. In one or more additional illustrative examples, a translation of an identifier of an object is displayed in conjunction with the translation AR content item 408 by one or more display devices of the one or more user devices 402 and a pronunciation of the translation may be played responsive to additional user input via one or more speakers of the one or more user devices 402. In one or more further illustrative examples, a translation of an identifier of an object is played via one or more speakers responsive to user input when text content including a translation of the identifier of the object is not being displayed. In this way, text content that corresponds to a translation of an identifier and audio content that corresponds to a pronunciation of the translation may be accessed and consumed independently by the user 404, in one or more scenarios.

In at least some examples, at least one of the AR translation system 412 or the translation AR content item 408 may track a gaze of the user 404 to determine one or more objects for which to provide at least one of the text translation data 616 or the audio translation data 618. In various examples, a gaze of the user 404 may correspond to a center of a field of view of one or more cameras 410 of the one or more user devices 402. In one or more examples, at least one of the text translation data 616 or the audio translation data 618 may be accessed by the translation AR content item 408 in response to determining an object in a center of a field of view of the camera 410. For example, in one or more examples, one or more objects may be within a field of view of the camera 410. At least one of the AR translation system 412 or the one or more user devices 402 may analyze the camera data 414 to determine a center of the field of view of the camera 410 and at least one object within the center of the field of view of the camera 410. In one or more illustrative examples, at least one of the text translation data 616 or the audio translation data 618 is generated by the AR translation system 412 for an object included in a center of the field of view of the camera 410. In one or more additional illustrative examples, in situations where multiple objects are included in the field of view of the camera 410, the AR translation system 412 determines at least one of text translation data 616 or audio translation data 618 for each of the multiple objects captured in the field of view of the camera 410. In these scenarios, in one or more examples, the translation AR content item 408 causes at least one of the text translation data 616 or the audio translation data 618 to be displayed and/or played for the object of the multiple objects in the center of the field of view of the camera 410. In these instances, in one or more additional examples, the translation AR content item 408 may cause at least one of the text translation data 616 or the audio translation data 618 to be displayed and/or played for each of the multiple objects in the field of view of the camera 410.

Figure 7:
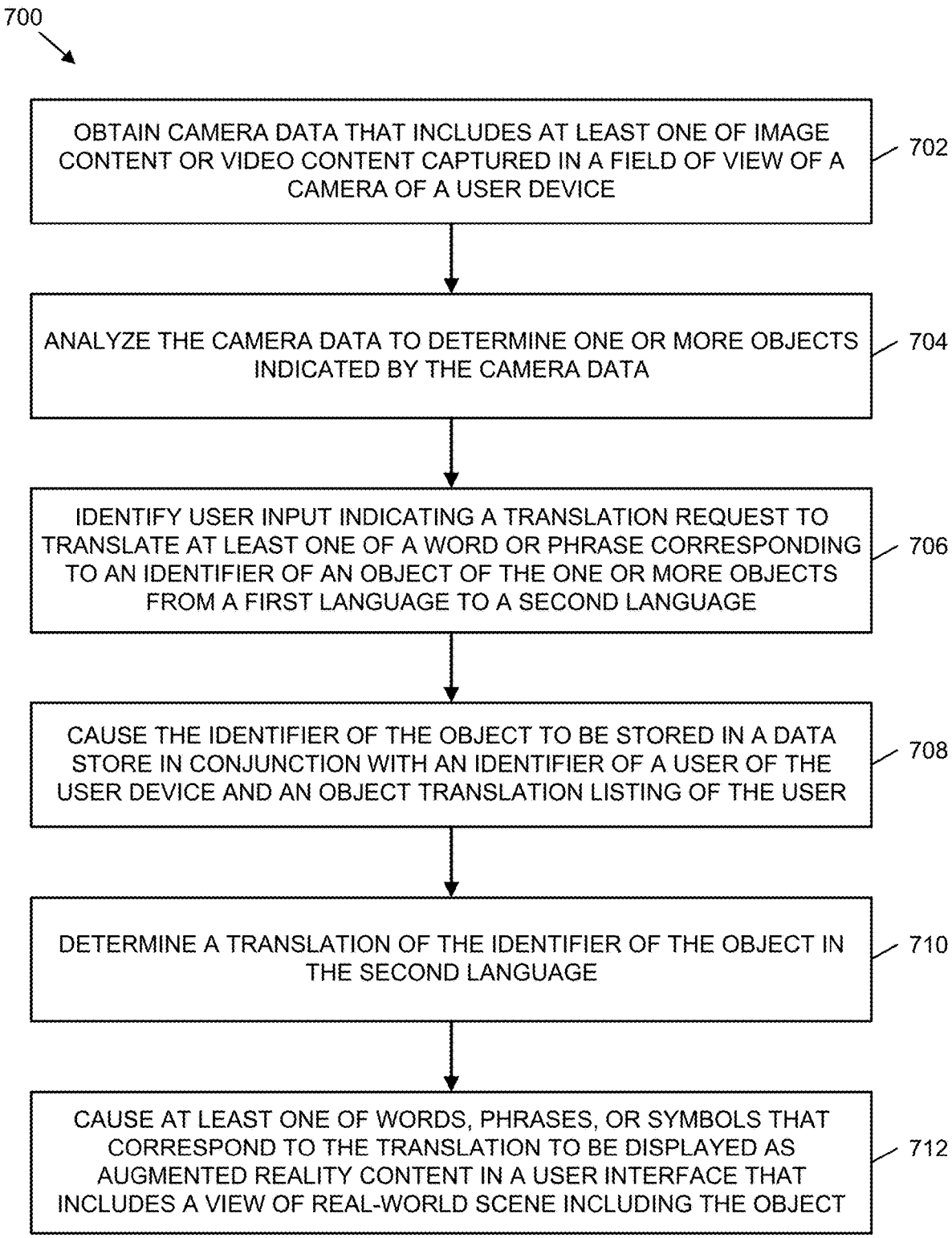
FIG. 7 is a flow diagram of a process to add objects to object translation listings of users of a user application and generate augmented reality content that includes translations of identifiers corresponding to the objects, in accordance with one or more examples.
Figure 8:
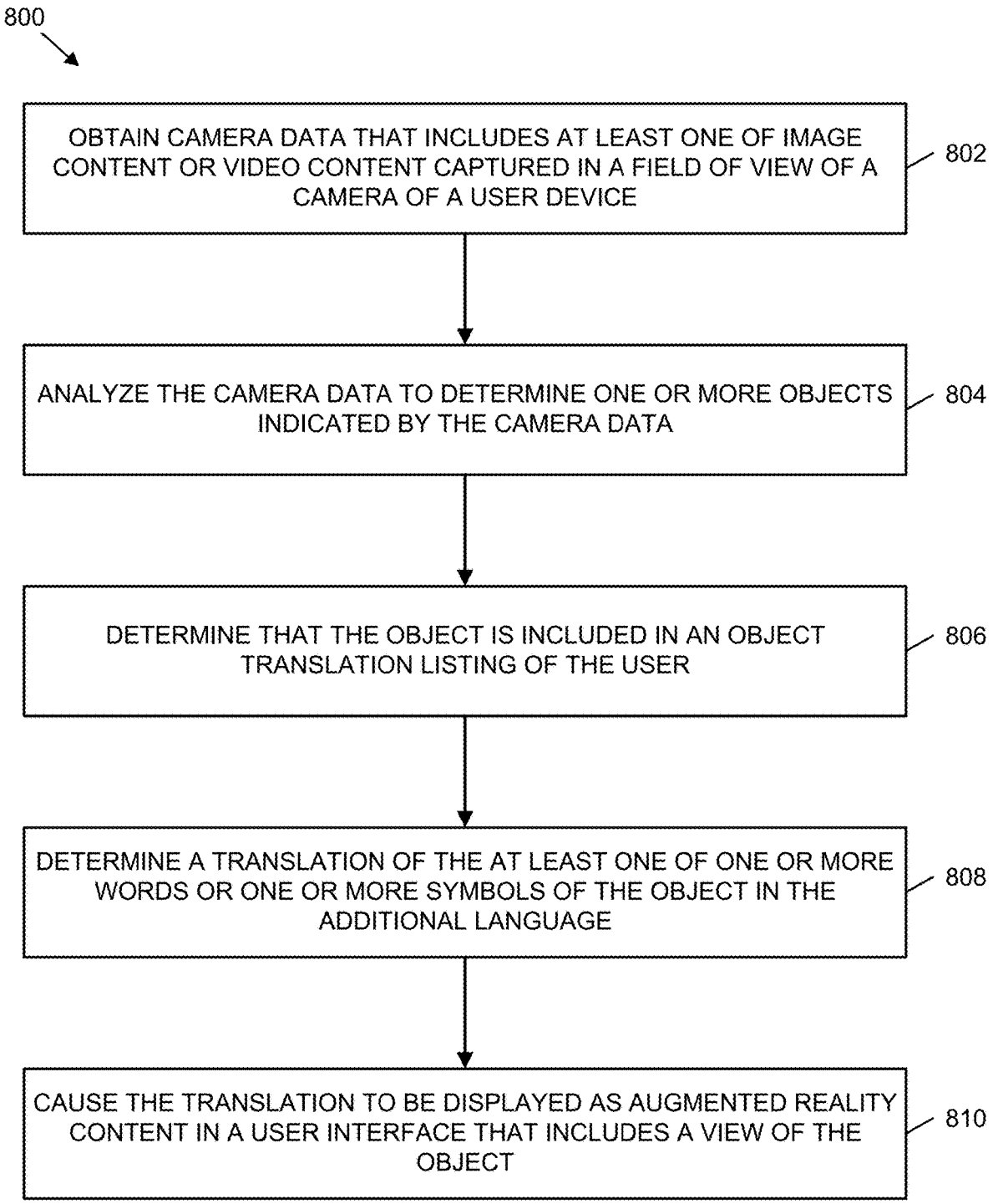
FIG. 8 is a flow diagram of a process to generate augmented reality content that includes translations of words corresponding to objects included in object translation listings of users of a user application, in accordance with one or more examples.

FIG. 7 and FIG. 8 illustrate flowcharts of example processes 700 and 800 to generate augmented reality content related to translations of identifiers of objects captured in a field of view of one or more cameras, in accordance with one or more examples. Implementations of the processes 700 and 800 may be embodied in computer-readable instructions for execution by one or more processors such that the operations of the processes may be performed in part or in whole by the functional components of at least one of one or more client devices or one or more server systems. Accordingly, the processes described below are by way of example with reference thereto, in some situations. However, in other implementations, at least some of the operations of the example processes described with respect to FIG. 7 and FIG. 8 may be deployed on various other hardware configurations. The example processes described with respect to FIG. 7 and FIG. 8 are therefore not intended to be limited to being performed by one or more server systems or one or more client devices described herein and can be implemented in whole, or in part, by one or more additional components. Although the described flowcharts can show operations as a sequential process, many of the operations can be performed in parallel or concurrently. In addition, the order of the operations may be rearranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 7 is a flow diagram of a process 700 to add objects to object translation listings of users of a user application and generate augmented reality content that includes translations of identifiers corresponding to the objects, in accordance with one or more examples. At 702, the process 700 may include obtaining camera data that includes at least one of image content or video content captured in a field of view of a camera of a user device. In one or more examples, the user device may include a head-worn device. In one or more illustrative examples, the head-worn device includes glasses. In one or more additional examples, the user device may include a wearable device. The wearable device may include activity trackers and/or watches and may also include other wearable devices, such as contact lenses, jewelry, or other items worn on at least one of ears, eyes, or other parts of a body of a user. In at least some examples, the user device may include multiple cameras. In these scenarios, the field of view includes a combined field of view of the multiple cameras.

In addition, at 704, the process 700 may include analyzing the camera data to determine one or more objects indicated by the camera data. In one or more examples, the camera data may be analyzed using one or more object detection machine learning techniques to determine the one or more objects indicated by the camera data. In various examples, the camera data may also be analyzed to determine an arrangement of objects included in a real-world scene captured by the camera. The arrangement of objects may indicate spatial relationships between objects included in a real-world scene. In at least some examples, the camera data may be analyzed to determine real-world coordinates of one or more objects included in a real-world scene. In one or more further examples, the camera data may be analyzed to track a gaze of the user. Additionally, the camera data may be analyzed to determine one or more objects within the gaze of the user. In one or more illustrative examples, the gaze of the user is determined by identifying a center of a field of view of one or more cameras of the user device.

At 706, the process 700 may also include identifying user input indicating a translation request to translate an identifier of an object including at least one of a word or phrase corresponding to the object from among the one or more objects from a first language to an additional language. In one or more examples, the first language may correspond to a default language. In various examples, the default language and the additional language may be selected by the user. In one or more additional examples, at least one of the default language or the additional language may be based on one or more locations of the user. In one or more illustrative examples, the default language corresponds to a language in which the user is at least one of conversant or fluent and the additional language may correspond to a language that the user is attempting to learn. In at least some examples, the user input indicating the translation request may correspond to at least one of audio input or one or more gestures captured by the camera. In one or more additional examples, a user interface element may be displayed in a user interface that is selectable to generate the translation request. The user interface element may be displayed in response to determining that the object is not present in the object translation listing of the user.

Further, at 708, the process 700 may include causing an identifier of the object to be stored in a data store in conjunction with an identifier of the user of the user device and an object translation listing of the user. The object translation listing of the user may indicate one or more objects for which the user has requested an identifier to be translated from the default language to the additional language. In at least some examples, the object translation listing may indicate one or more locations of the one or more objects. Individual locations of the one or more locations may correspond to a group of one or more objects having at least one of one or more words, one or more characters, one or more symbols, or one or more phrases translated from the default language to at least one additional language of the one or more additional languages The process 700 may include, at 710, determining a translation of the at least one of the one or more words, the one or more characters, the one or more symbols, or the one or more phrases corresponding to the identifier of object in the additional language. In one or more examples, the translation may be determined using one or more machine learning translation algorithms. In one or more additional examples, the translation may be obtained using one or more API calls to at least one translation service. In one or more illustrative examples, the translation is obtained using one or more API calls of a third-party translation service.

At 712, the process 700 may include causing a translated identifier including at least one of words, phrases, characters, or symbols that correspond to the translation to be displayed in augmented reality content in a user interface that includes a view of the object. In one or more examples, the augmented reality content may include at least one of text content, image content, video content, or animation content that is displayed in the user interface. In at least some examples, the augmented reality content may be displayed in proximity to the object within the user interface, where the user interface includes a view of a real-world scene that includes the object. In one or more illustrative examples, the user interface includes a live view of the real-world scene. In one or more additional examples, the augmented reality content may include audio content. To illustrate, an audio file is generated that includes an audible pronunciation of at least one of the word or phrase of the identifier of the object in at least one of the default language or the additional language. The audio file may be sent to the user device for playback in conjunction with the text, video, or image augmented reality content of the translation being displayed.

In one or more examples, the translation of the identifier of the object may be displayed responsive to determining that the user is located in a location that corresponds to the object. The location may be indicated in the object translation listing of the user. In one or more examples, the arrangement of the one or more objects in a real-world scene may be used to determine a location of a user of the user device. In one or more additional examples, the location of the user may be determined based on GPS coordinates accessed via the user device.

In various examples, as the field of view of the camera changes, additional translations of additional objects in the field of view of the camera are determined. For example, the field of view of the camera may change from a first field of view to a second field of view. In these scenarios, additional camera data is analyzed to determine an additional object in the second field of view. In one or more examples, the additional object may be added to the translation listing of the user in response to input from the user to obtain a translation of an identifier of the additional object. Additionally, augmented reality content may be generated that includes at least one of text content, video content, image content, animation content, or audio content that corresponds to the translation of the identifier of the additional object.

FIG. 8 is a flow diagram of a process 800 to generate augmented reality content that includes translations of identifiers corresponding to objects included in object translation listings of users, in accordance with one or more examples. At 802, the process 800 may include obtaining camera data that includes at least one of image content or video content captured in a field of view of a camera of a user device. In one or more examples, the user device may include a head-worn device. In one or more illustrative examples, the head-worn device includes glasses. In one or more additional examples, the user device may include a wearable device. The wearable device may include activity trackers and/or watches and may also include other wearable devices, such as contact lenses, jewelry, or other items worn on at least one of ears, eyes, or other parts of a body of a user. In at least some examples, the user device may include multiple cameras. In these scenarios, the field of view includes a combined field of view of the multiple cameras.

The process 800 may also include, at 804, analyzing the camera data to determine one or more objects indicated by the camera data. In various examples, the camera data may be analyzed to identify one or more objects responsive to a translation AR content item being executed within an instance of a user application executed by the user device. For example, the AR translation content item may be activated in response to input from the user. While the translation AR content item is activated and executing within an instance of the user application, the camera data that is captured by the camera is analyzed to determine objects indicated by the camera data. Additionally, during activation of the translation AR content item, operations directed to determining translations of identifiers of objects indicated by the camera data and generating augmented reality content related to the translations may also be activated.

In addition, at 806, the process 800 may include determining that the object is included in an object translation listing of the user. For example, the camera data may be analyzed to determine characteristics of the object, such as one or more contours, one or more edges, one or more colors, one or more textures, or one or more shades. The characteristics of the object may be used to determine an identifier that corresponds to object. To illustrate, the characteristics of the object are analyzed with respect to characteristics of other objects to determine an amount of similarity between the characteristics of the object and characteristics of one or more additional objects. In situations where the amount of similarity is at least a threshold level, an identifier is assigned to the object. In these scenarios, the identifier of the object may be analyzed in relation to identifiers of one or more further objects included in the object translation listing to determine whether the object is included in the object translation listing. In one or more illustrative examples, the object may be identified as a lamp and the object translation listing is parsed to determine whether a translation for the word "lamp" is associated with the object translation listing.

Further, the process 800 may include, at 808, determining a translation of the at least one of one or more words, one or more symbols, one or more phrases, or one or more characters of the object in an additional language. At 810, the process 800 may include causing the translation to be displayed as augmented reality content in a user interface that includes a view of the object. In one or more examples, causing the translation to be displayed as the augmented reality content in the user interface is responsive to determining that the object is included in the group of the one or more translated objects that correspond to the location.

Figure 9:
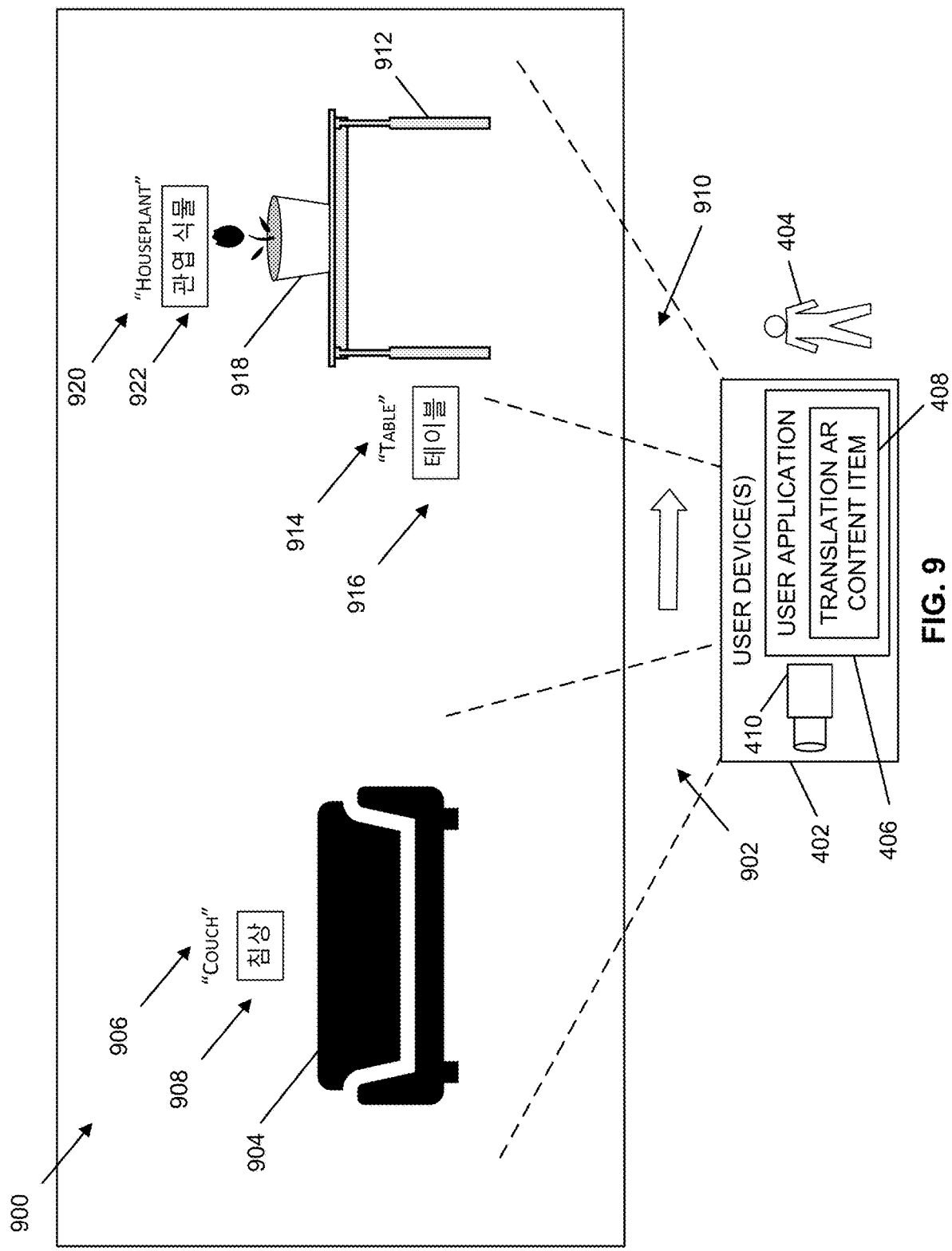
FIG. 9 is a diagram including a user interface that includes a view of a real-world scene and includes augmented reality content corresponding to translations of object included in the real-world scene, in accordance with one or more examples.

FIG. 9 is a diagram including a user interface 900 that includes a view of a real-world scene and augmented reality content corresponding to translations of objects included in the real-world scene, in accordance with one or more examples. The user interface 900 may be displayed by a user device 402. In one or more examples, the user interface 900 may be displayed in conjunction with the translation AR content item 408 executing within the user application 406.

The illustrative example of FIG. 9 indicates a first field of view 902 of the real-world scene. The first field of view 902 may include a first object 904. A first identifier 906 of the first object 904 in a first language may be displayed as augmented reality content, such as a virtual object, in the user interface 900. Additionally, a first additional identifier 908 of the first object 904 in a second language may also be displayed as augmented reality content in the user interface 900. Further, the first identifier 906 and the first additional identifier 908 may be displayed proximate to the first object 904. At least one of the first identifier 906 or the first additional identifier 908 may be displayed in response to determining that camera data captured by the camera 410 corresponds to the first field of view 902.

The field of view of the camera 410 may be modified from the first field of view 902 to a second field of view 910. A second object 912 may be included in the second field of view 910. A second identifier 914 of the second object 912 in the first language may be displayed as augmented reality content in the user interface 900. Further, a second additional identifier 916 of the second object 912 in the second language may also be displayed in the user interface 900 as augmented reality content. The second identifier 914 and the second additional identifier 916 may be displayed proximate to the second object 912. A third object 918 may also be within the second field of view 910. A third identifier 920 of the third object 918 in the first language and a third additional identifier 922 of the third object 918 in the second language may be displayed in the user interface 900. The third identifier 920 and the third additional identifier 922 may be displayed proximate to the third object 918.

In various examples, at least one of the second identifier 914, the second additional identifier 916, the third identifier 920, or the third additional identifier 922 may be displayed in response to determining that camera data captured by the camera 410 corresponds to the second field of view 910. In one or more examples, each of the second identifier 914, the second additional identifier 916, the third identifier 920, and the third additional identifier 922 may be displayed in the user interface 900 in response to determining that the field of view of the camera 410 corresponds to the second field of view 910. In one or more additional examples, a gaze of the user 404 may be determined and estimated as the center of the second field of view 910. In these scenarios, the second identifier 914 and the second additional identifier 916 are displayed in response to determining that the second object 912 is in the center of the second field of view 910 of the camera 410. Further, the third identifier 920 and the third additional identifier 922 may be displayed in response to determining that the third object 918 is in the center of the second field of view 910 of the camera 410.

In one or more examples, at least one of the identifiers 906, 908, 914, 916, 920, 922 may be displayed as at least one of text content, video content, image content, or animation content. Additionally, audio content may be played that corresponds to pronunciations of at least a portion of the identifiers 906, 908, 914, 916, 920, 922. For example, audio content corresponding to at least one of the first identifier 906 or the first additional identifier 908 may be displayed in response to determining that the field of view of the camera 410 corresponds to the first field of view 902. Further, audio content corresponding to at least one of the second identifier 914, the second additional identifier 916, the third identifier 920, or the third additional identifier 922 may be displayed in response to determining that the field of view of the camera 410 corresponds to the second field of view 910.

Figure 10:
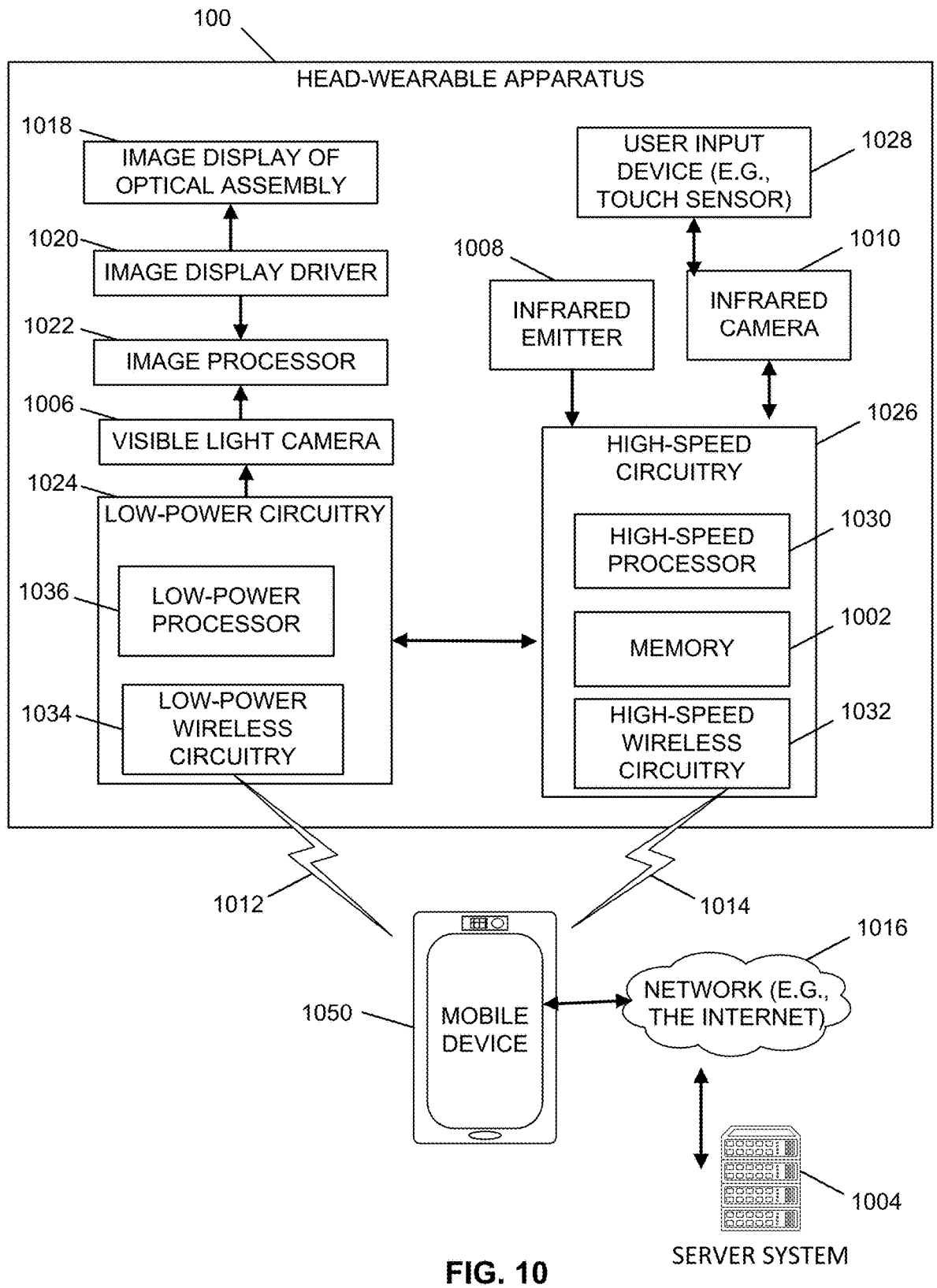
FIG. 10 is a block diagram showing a software architecture within which the present disclosure may be implemented, in accordance with one or more examples.

FIG. 10 is a block diagram illustrating a networked system 1000 including details of the glasses 100, in accordance with some examples. FIG. 10 illustrates a system 1000 including a head-wearable apparatus 100 with a selector input device, according to some examples. FIG. 10 is a high-level functional block diagram of an example head-wearable apparatus 100 communicatively coupled to a mobile device 1050 and various server systems 1004 (e.g., the interaction server system 1110 described with respect to FIG. 11) via various networks 1016.

The head-wearable apparatus 100 includes one or more cameras, each of which may be, for example, a visible light camera 1006, an infrared emitter 1008, and an infrared camera 1010.

The mobile device 1050 connects with head-wearable apparatus 100 using both a low-power wireless connection 1012 and a high-speed wireless connection 1014. The mobile device 1050 is also connected to the server system 1004 and the network 1016.

The head-wearable apparatus 100 further includes two image displays of the image display of optical assembly 1018. The two image displays of optical assembly 1018 include one associated with the left lateral side and one associated with the right lateral side of the head-wearable apparatus 100. The head-wearable apparatus 100 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 100.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 1028 (e.g., touch sensor or push button), including an input surface on the head-wearable apparatus 100. The user input device 1028 (e.g., touch sensor or push button) is to receive from the user an input selection to manipulate the graphical user interface of the presented image.

The components shown in FIG. 10 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 1002, which stores instructions to perform a subset or all of the functions described herein. The memory 1002 can also include storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 100. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 100, and the operating system is stored in the memory 1002 for execution. In addition to any other responsibilities, the high-speed processor 1030 executing a software architecture for the head-wearable apparatus 100 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WiFi. In some examples, other high-speed communications standards may be implemented by the high-speed wireless circuitry 1032.

The low-power wireless circuitry 1034 and the high-speed wireless circuitry 1032 of the head-wearable apparatus 100 can include short-range transceivers (Bluetooth™) and wireless wide, local, or wide area network transceivers (e.g., cellular or WiFi). Mobile device 1050, including the transceivers communicating via the low-power wireless connection 1012 and the high-speed wireless connection 1014, may be implemented using details of the architecture of the head-wearable apparatus 100, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 926, in some examples, the memory 1002 may be an independent standalone element of the head-wearable apparatus 100. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 100 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 100 is connected to a host computer. For example, the head-wearable apparatus 100 is paired with the mobile device 1050 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 1050 and the head-wearable apparatus 100.

The mobile device 1050 includes a processor and a network communication interface coupled to the processor. The network communication interface allows for communication over the network 1016, low-power wireless connection 1012, or high-speed wireless connection 1014. Mobile device 1050 can further store at least portions of the instructions for generating binaural audio content in the mobile device 1050's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 100 further include acoustic components (e.g., speakers), haptic components (e.g., a vibratory motor), other signal generators, and so forth. The input components of the head-wearable apparatus 100, the mobile device 1050, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 1050 via the low-power wireless circuitry 1034 or high-speed wireless circuitry 1032.

Figure 11:
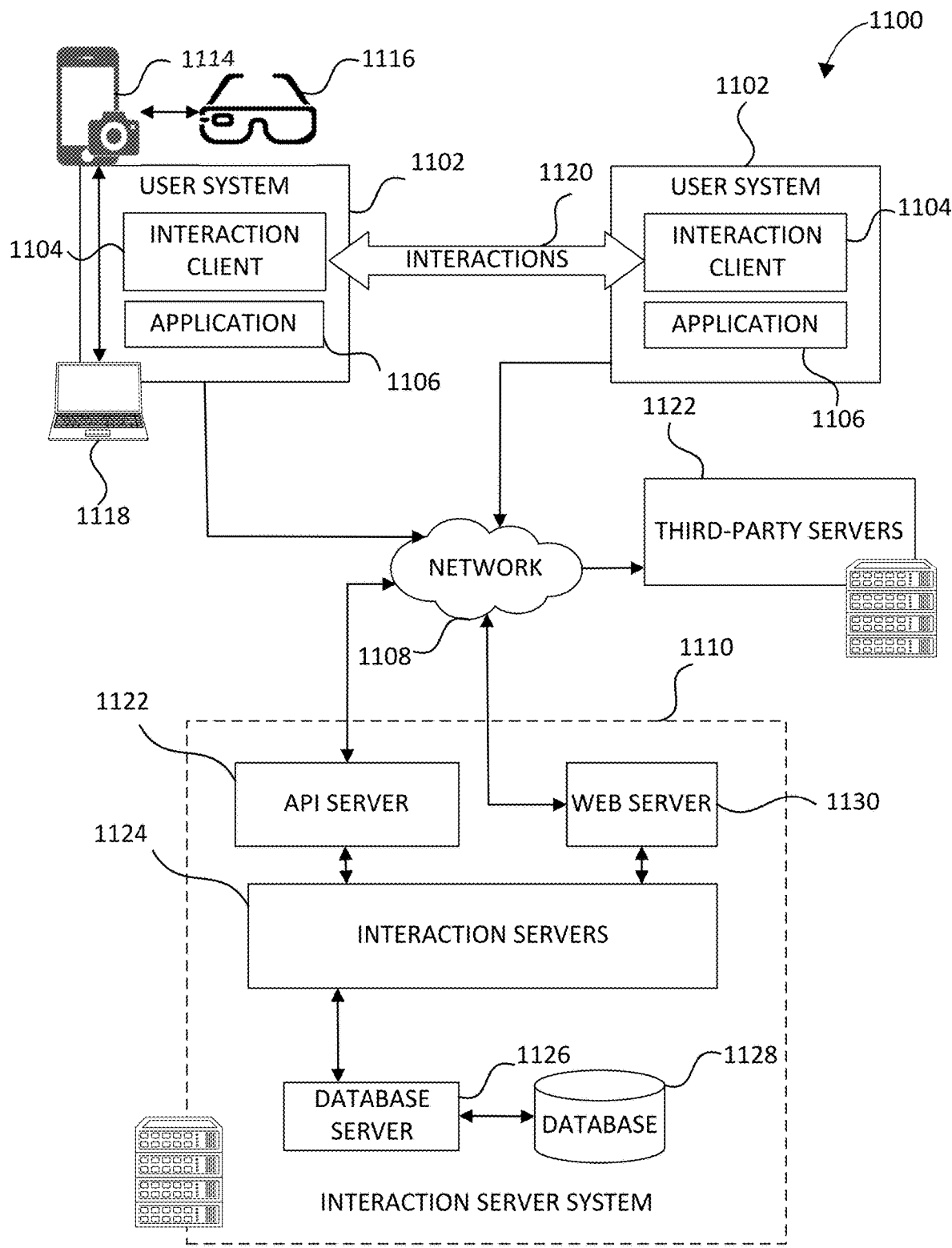
FIG. 11 is a block diagram illustrating details of the head-worn device of FIG. 1, in accordance with one or more examples.

FIG. 11 is a block diagram showing an example interaction system 1100 for facilitating interactions (e.g., exchanging text messages, conducting text audio and video calls, or playing games) over a network. The interaction system 1100 includes multiple user systems 1102, each of which hosts multiple applications, including an interaction client 1104 and other applications 1106. Each interaction client 1104 is communicatively coupled, via one or more communication networks including a network 1108 (e.g., the Internet), to other instances of the interaction client 1104 (e.g., hosted on respective other user systems 1102), an interaction server system 1110 and third-party servers 1112). An interaction client 1104 can also communicate with locally hosted applications 1106 using Applications Program Interfaces (APIs).

Each user system 1102 may include multiple user devices, such as a mobile device 1114, head-wearable apparatus 1116, and a computer client device 1118 that are communicatively connected to exchange data and messages.

An interaction client 1104 interacts with other interaction clients 1104 and with the interaction server system 1110 via the network 1108. The data exchanged between the interaction clients 1104 (e.g., interactions 1120) and between the interaction clients 1104 and the interaction server system 1110 includes functions (e.g., commands to invoke functions) and payload data (e.g., text, audio, video, or other multimedia data).

The interaction server system 1110 provides server-side functionality via the network 1108 to the interaction clients 1104. While certain functions of the interaction system 1100 are described herein as being performed by either an interaction client 1104 or by the interaction server system 1110, the location of certain functionality either within the interaction client 1104 or the interaction server system 1110 may be a design choice. For example, it may be technically preferable to initially deploy particular technology and functionality within the interaction server system 1110 but to later migrate this technology and functionality to the interaction client 1104 where a user system 1102 has sufficient processing capacity.

The interaction server system 1110 supports various services and operations that are provided to the interaction clients 1104. Such operations include transmitting data to, receiving data from, and processing data generated by the interaction clients 1104. This data may include message content, client device information, geolocation information, media augmentation and overlays, message content persistence conditions, social network information, and live event information. Data exchanges within the interaction system 1100 are invoked and controlled through functions available via user interfaces (UIs) of the interaction clients 1104.

Turning now specifically to the interaction server system 1110, an Application Program Interface (API) server 1122 is coupled to and provides programmatic interfaces to interaction servers 1124, making the functions of the interaction servers 1124 accessible to interaction clients 1104, other applications 1106 and third-party server 1112. The interaction servers 1124 are communicatively coupled to a database server 1126, facilitating access to a database 1128 that stores data associated with interactions processed by the interaction servers 1124. Similarly, a web server 1130 is coupled to the interaction servers 1124 and provides web-based interfaces to the interaction servers 1124. To this end, the web server 1130 processes incoming network requests over the Hypertext Transfer Protocol (HTTP) and several other related protocols.

The Application Program Interface (API) server 1122 receives and transmits interaction data (e.g., commands and message payloads) between the interaction servers 1124 and the client systems 1102 (and, for example, interaction clients 1104 and other application 1106) and the third-party server 1112. Specifically, the Application Program Interface (API) server 1122 provides a set of interfaces (e.g., routines and protocols) that can be called or queried by the interaction client 1104 and other applications 1106 to invoke functionality of the interaction servers 1124. The Application Program Interface (API) server 1122 exposes various functions supported by the interaction servers 1124, including account registration; login functionality; the sending of interaction data, via the interaction servers 1124, from a particular interaction client 1104 to another interaction client 1104; the communication of media files (e.g., images or video) from an interaction client 1104 to the interaction servers 1124; the settings of a collection of media data (e.g., a story); the retrieval of a list of friends of a user of a user system 1102; the retrieval of messages and content; the addition and deletion of entities (e.g., friends) to an entity graph (e.g., a social graph); the location of friends within a social graph; and opening an application event (e.g., relating to the interaction client 1104).

Figure 12:
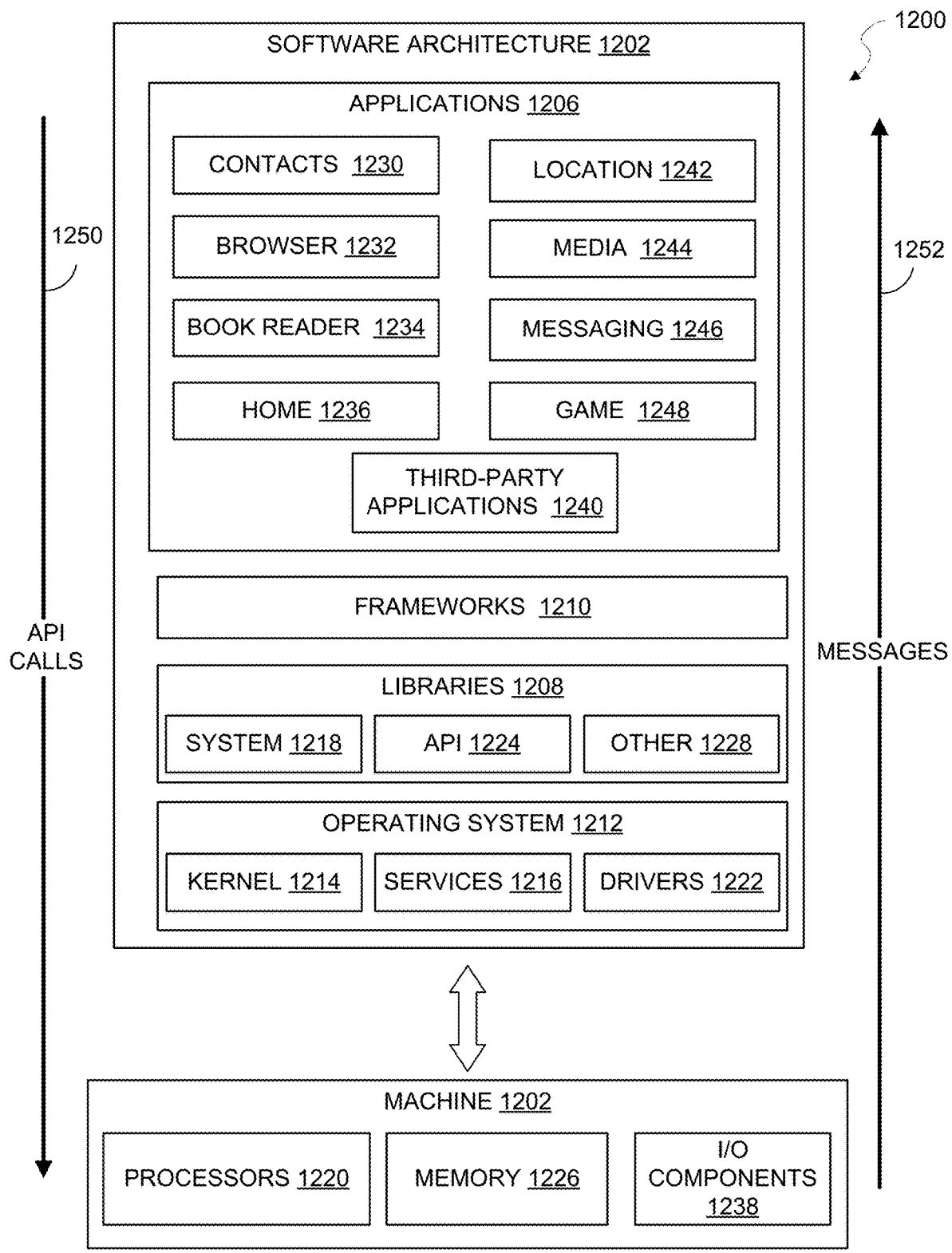
FIG. 12 is a diagrammatic representation of a networked environment in which the present disclosure may be deployed, in accordance with one or more examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where individual layers provide a particular functionality. The software architecture 1204 includes layers such as an operating system 1212, libraries 1208, frameworks 1210, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1208 provide a low-level common infrastructure used by the applications 1206. The libraries 1208 can include system libraries 1218 (e.g., C standard library) that provide functions such as memory allocation functions, string manipulation functions, mathematic functions, and the like. In addition, the libraries 1208 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1208 can also include a wide variety of other libraries 1228 to provide many other APIs to the applications 1206.

The frameworks 1210 provide a high-level common infrastructure that is used by the applications 1206. For example, the frameworks 1210 provide various graphical user interface (GUI) functions, high-level resource management, and high-level location services. The frameworks 1210 can provide a broad spectrum of other APIs that can be used by the applications 1206, some of which may be specific to a particular operating system or platform.

In an example, the applications 1206 may include a home Application 1236, a contacts Application 1230, a browser Application 1232, a book reader Application 1234, a location Application 1242, a media Application 1244, a messaging Application 1246, a game Application 1248, and a broad assortment of other applications such as third-party applications 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
obtaining, by a computing system comprising one or more processors and memory, camera data that includes at least one of image content or video content captured in a field of view of a camera of a user device;
analyzing, by the computing system, the camera data to determine one or more objects indicated by the camera data;
identifying, by the computing system, user input indicating a translation request to translate at least one of a word or phrase corresponding to a first identifier of an object of the one or more objects, the at least one of the word or phrase being in a first language;
causing, by the computing system, the first identifier of the object to be stored in a data store in conjunction with an identifier of a user of the user device and in conjunction with an object translation listing of the user, the object translation listing of the user including at least one object having at least one of one or more words or one or more phrases that have been translated from the first language to a second language;
determining, by the computing system, a translation of the first identifier of the object, the translation corresponding to a second identifier of the object in the second language; and
causing, by the computing system, at least one of words, phrases, characters, or symbols that correspond to the translation to be displayed as augmented reality content in a user interface that includes a view of a real-world scene including the object, wherein the translation is displayed as an overlay of the real-world scene and proximate to the object.

2. The computer-implemented method of claim 1, comprising:
determining, by the computing system, a location of the user device; and
causing, by the computing system, the identifier of the object to be stored in the object translation listing in conjunction with the location.

3. The computer-implemented method of claim 2, wherein the location of the object is determined based on an arrangement of a plurality of objects in an environment that includes the object.

4. The computer-implemented method of claim 2, wherein the location of the object is determined based on geographic positioning system (GPS) data obtained from the user device.

5. The computer-implemented method of claim 1, comprising:
generating, by the computing system, an audio file that includes an audible pronunciation of the second identifier of the object in the second language; and
causing, by the computing system, the audio file to be sent to the user device for playback in conjunction with the augmented reality content including the translation being displayed.

6. The computer-implemented method of claim 1, comprising:
responsive to identifying the user input indicating the translation request, generating, by the computing system, one or more application programming interface (API) calls to obtain the translation from a third-party translation service;
sending, by the computing system, the one or more API calls to the third-party translation service;
obtaining, by the computing system, the translation from the third-party translation service; and
sending, by the computing system, the translation to the user device.

7. The computer-implemented method of claim 1, comprising:
determining, by the computing system, that the field of view of the camera changed from a first field of view to a second field of view;
obtaining, by the computing system, additional camera data that corresponds to the second field of view;
analyzing, by the computing system, the additional camera data to determine an additional object included in the second field of view; and
determining, by the computing system, that the additional object is included in the object translation listing of the user.

8. The computer-implemented method of claim 7, comprising:
obtaining, by the computing system, an additional translation of at least one of one or more words, one or more phrases, one or more characters, or one or more symbols of an additional identifier of the additional object in the second language;
causing, by the computing system, the additional translation to be displayed as additional augmented reality content in an additional user interface that includes an additional view of an additional real-world scene that includes the additional object;
generating, by the computing system, an audio file that includes an audible pronunciation in the second language of the additional identifier of the additional object; and
causing, by the computing system, the audio file to be sent to the user device for playback in conjunction with the additional augmented reality content including the additional translation being displayed.

9. The computer-implemented method of claim 1, wherein the user input indicating the translation request corresponds to touch input on a portion of a frame of a head-wearable device.

10. The computer-implemented method of claim 1, wherein the user input indicating the translation request corresponds to at least one of audio input captured by one or more microphones or one or more gestures captured by the camera.

11. A computing apparatus comprising:
one or more processors; and
a memory storing instructions that, when executed by the one or more processors, cause the computing apparatus to perform operations comprising:
obtaining camera data that includes at least one of image content or video content captured in a field of view of a camera of a user device;
analyzing the camera data to determine one or more objects indicated by the camera data;
identifying user input indicating a translation request to translate at least one of a word or phrase corresponding to a first identifier of an object of the one or more objects, the at least one of the word or phrase being in a first language;
causing the first identifier of the object to be stored in a data store in conjunction with an identifier of a user of the user device and in conjunction with an object translation listing of the user, the object translation listing of the user including at least one object having at least one of one or more words, one or more phrases, one or more characters, or one or more symbols that have been translated from the first language to a second language;

determining a translation of the first identifier of the object, the translation corresponding to a second identifier of the object in the second language; and causing at least one of words, phrases, characters, or symbols that correspond to the translation to be displayed as augmented reality content in a user interface that includes a view of a real-world scene including the object, wherein the translation is displayed as an overlay of the real- world scene and proximate to the object.

12. The computing apparatus of claim 11, wherein the object translation listing includes a data structure that is stored in a data store in conjunction with the identifier of the user, the identifier of the user corresponding to a default language, one or more additional languages, and one or more locations, individual locations of the one or more locations corresponding to a group of one or more objects having at least one of one or more words or one or more phrases of one or more identifiers of the one or more objects translated from the default language to at least one additional language of the one or more additional languages.

13. The computing apparatus of claim 11, the memory stores additional instructions that, when executed by the one or more processors, cause the computing apparatus to perform additional operations comprising:

analyzing the camera data to determine an arrangement of a plurality of objects in an environment that includes the object;

determining a location of the object based on the arrangement of the plurality of objects;

determining, based on the location, that the object is not present in the object translation listing of the user; and causing an option to be provided to the user to add the object to the object translation listing of the user.

14. A computer-implemented method comprising:

obtaining, by a computing system comprising one or more processors and memory, camera data that includes at least one of image content or video content captured in a field of view of a camera of a user device;

analyzing, by the computing system, the camera data to determine one or more objects indicated by the camera data;

determining, by the computing system, that an object of the one or more objects is included in an object translation listing of a user of the user device, the object translation listing of the user including at least one object having an identifier including at least one of one or more words or one or more phrases that have been translated from a first language to a second language;

determining, by the computing system, a translation of a first identifier of the object, wherein the translation corresponds to a second identifier of the object including at least one of one or more words, one or more phrases, one or more characters, or one or more symbols in the second language; and causing, by the computing system, the translation to be displayed as augmented reality content in a user interface that includes a view of a real-world scene that includes the object, wherein the translation is displayed as an overlay of the real-world scene and proximate to the object.

15. The computer-implemented method of claim 14, wherein the one or more objects indicated by the camera data include a plurality of objects, and the method comprises:

analyzing, by the computing system, the camera data to determine an arrangement of the plurality of objects;

determining, by the computing system, a location that corresponds to the field of view based on the arrangement of the plurality of objects; and determining, by the computing system, that the object is included in a group of one or more translated objects that correspond to the location.

16. The computer-implemented method of claim 15, wherein causing the translation to be displayed as the augmented reality content in the user interface is responsive to determining that the object is included in the group of one or more translated objects that correspond to the location.

17. The computer-implemented method of claim 14, comprising:

determining, by the computing system, that a translation augmented reality (AR) content item is executing within an instance of a user application executed by the user device;

wherein the camera data is analyzed to determine the one or more objects indicated by the camera data responsive to determining that the translation AR content item is executing within the instance of the user application executed by the user device.

18. The computer-implemented method of claim 14, comprising:

generating, by the computing system, an audio file that includes an audible pronunciation of the at least one of the one or more words, one or more phrases, one or more characters, or one or more symbols corresponding to the second identifier of the object in the second language; and causing, by the computing system, the audio file to be sent to the user device for playback in conjunction with the augmented reality content including the translation being displayed.

19. The computer-implemented method of claim 14, comprising:

determining, by the computing system, that the field of view of the camera changed from a first field of view to a second field of view;

obtaining, by the computing system, additional camera data that corresponds to the second field of view;

analyzing, by the computing system, the additional camera data to determine an additional object included in the second field of view;

determining, by the computing system, that the additional object is absent from the object translation listing of the user; and causing, by the computing system, an option to be provided to the user to add the additional object to the object translation listing of the user.

20. The computer-implemented method of claim 19, comprising:

identifying, by the computing system, user input indicating a translation request to translate at least one of one or more first additional words, one or more first additional phrases, one or more first additional characters, or one or more first additional symbols in the first language of a first additional identifier of the additional object to a second language;

causing, by the computing system, the first additional identifier of the additional object to be stored in a data store in conjunction with an identifier of the user in the object translation listing of the user;

determining, by the computing system, an additional translation that includes at least one of one or more second additional words, one or more second additional phrases, one or more second additional characters, or one or more second additional symbols in the second language corresponding a second additional identifier of the additional object; and
causing, by the computing system, the second additional identifier to be displayed as augmented reality content in a user interface that includes a view of a real-world scene including the object.

* * * * *